US012481670B2

United States Patent
Mittal et al.

(10) Patent No.: US 12,481,670 B2
(45) Date of Patent: Nov. 25, 2025

(54) SYSTEM AND METHOD FOR QUERY ACCELERATION FOR USE WITH DATA ANALYTICS ENVIRONMENTS

(71) Applicant: Oracle International Corporation, Redwood Shores, CA (US)

(72) Inventors: Ashish Mittal, Redwood Shores, CA (US); Kenneth Eng, Redwood City, CA (US); Alextair Mascarenhas, Foster City, CA (US); David Wong, Redwood City, CA (US); Praful Hebbar, Bangalore (IN); Yi Ge, San Mateo, CA (US); Mahadevan Rajagopalan, Pleasanton, CA (US); Roger Bolsius, Round Rock, TX (US); Vijayakumar Ranganathan, Woodside, CA (US); Samar Lotia, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/895,665

(22) Filed: Aug. 25, 2022

(65) Prior Publication Data
US 2023/0081067 A1 Mar. 16, 2023

Related U.S. Application Data

(60) Provisional application No. 63/237,963, filed on Aug. 27, 2021.

(51) Int. Cl.
*G06F 16/245* (2019.01)
*G06F 16/2453* (2019.01)
*G06F 16/25* (2019.01)

(52) U.S. Cl.
CPC ...... *G06F 16/254* (2019.01); *G06F 16/24549* (2019.01); *G06F 16/258* (2019.01)

(58) Field of Classification Search
CPC . G06F 16/24549; G06F 16/254; G06F 16/258
See application file for complete search history.

(56) References Cited

U.S. PATENT DOCUMENTS 11,321,344 B2    5/2022   Karl
2016/0085808 A1*  3/2016  Venkata ............... G06F 16/25
                                              707/769

(Continued)

OTHER PUBLICATIONS

ORACLE®, "What's New for Oracle Analytics Cloud", Jul. 2022 Update, © ORACLE, 23 pages.

(Continued)

*Primary Examiner* — Grace Park
(74) *Attorney, Agent, or Firm* — TUCKER ELLIS LLP

(57) ABSTRACT

In accordance with an embodiment, described herein is a system and method for providing query acceleration with a computing environment such as, for example, a business intelligence environment, database, data warehouse, or other type of environment that supports data analytics. A middle layer is provided as a long-term table data storage format; and one more acceleration formats, or acceleration tables, can be periodically regenerated from the middle layer, wherein a determination can be made as to whether an accelerated table exists for a dataset table, and if so, then the accelerated table is used to process the query.

20 Claims, 28 Drawing Sheets

(56) References Cited

U.S. PATENT DOCUMENTS

| | | | |
|---|---|---|---|
| 2017/0220685 A1* | 8/2017 | Yan | G06F 16/288 |
| 2018/0189370 A1* | 7/2018 | Bendel | G06F 16/27 |
| 2019/0324964 A1* | 10/2019 | Shiran | G06F 16/2228 |
| 2021/0089550 A1 | 3/2021 | Karl | |

OTHER PUBLICATIONS

Kumar, Sakshi; "Joining Data in OAC", Rittman Mead © 2022, Jul. 29, 2021, 11 pages.

Janardanam, Pravin; "Modeling Your Data with Self-Service Data Sets in Oracle Analytics", Oracle Analytics, May 24, 2021, 6 pages.

Agrawal, Sandeep R et al., "A Many-core Architecture for In-Memory Data Processing", MICRO-50, Oct. 14, 2017, © 2017 Association for Computing Machinery, 14 pages.

Fry, Nick et al., ORACLE®, "Visualizing Data and Building Reports in Oracle Analytics Cloud", E81765-57, May 2022, © 2017, 2022, 556 pages.

ORACLE®, "Oracle Analytics Cloud 6.0", Apr. 2021 Release Announcement, 4 pages.

Altinel, Mehmet et al., "Cache Tables: Paving the Way for an Adaptive Database Cache", Proceedings of the 29th VLDB Conference, Berlin Germany 2003, 12 pages.

Bornhövd, Christof et al., "Adaptive Database Caching with DBCache", IEEE Data Eng. Bull. 27 (2004): 11-18.

Leonard, Wesley et al., "Cross Engine Database Joining", 2010 Eighth ACIS International Conference on Software Engineering Research, Management and Applications (2010): 19-16.

Li, Wen-Syan et al., "Load balancing and data placement for multi-tiered database systems", Data & Knowledge Engineering 62 (2007): 525-546.

Larson, Per-Åke et al., "MTCache: Mid-Tier Database Caching for SQL Server", Apr. 30, 2004, 6 pages.

Larson, Per-Åke et al., "MTCache: Transparent Mid-Tier Database Caching in SQL Server", Proceedings of the 20th International Conference on Data Engineering (2002), 12 pages.

IBM®, "IBM Information Integrator joins the IBM WebSphere brand", IBM United States Announcement 205-048, dated Mar. 1, 2005, 37 pages.

European Patent Office, Notification of Transmittal of The International Search Report and The Written Opinion of the International Search Authority, or Declaration dated Jan. 2, 2023 for International Application No. PCT/US2022/041715, 19 pages.

European Patent Office, Communication pursuant to Rules 161(1) and 162 EPC dated Apr. 5, 2024 for European Patent Application No. 22772736.9, 3 pages.

European Patent Office, Notification Concerning Transmittal of International Preliminary Report on Patentability dated Mar. 7, 2024 for European Patent Application No. PCT/US2022/041715, 13 pages.

Dremio Team, "Getting Started With Reflections", retrieved from <https://www.dremio.com/resources/tutorials/getting-started-with-reflections/#h-how-reflection-works5> on Jun. 20, 2025, 25 pages.

* cited by examiner

SYSTEM AND METHOD FOR QUERY ACCELERATION FOR USE WITH DATA ANALYTICS ENVIRONMENTS

CLAIM OF PRIORITY

This application claims the benefit of priority to U.S. Provisional Patent Application titled "SYSTEM AND METHOD FOR BI QUERY ACCELERATION FOR USE WITH DATA ANALYTICS ENVIRONMENTS", Application No. 63/237,963, filed Aug. 27, 2021; which application and its content thereof is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence or other data, and are particularly related to a system and method for providing query acceleration for use with such environments.

BACKGROUND

Data analytics enables computer-based examination of large amounts of data, for example to derive conclusions or other information from the data. For example, business intelligence tools can be used to provide users with business intelligence describing their enterprise data, in a format that enables the users to make strategic business decisions.

SUMMARY

In accordance with an embodiment, described herein is a system and method for providing query acceleration with a computing environment such as, for example, a business intelligence environment, database, data warehouse, or other type of environment that supports data analytics. A middle layer is provided as a long-term table data storage format; and one more acceleration formats, or acceleration tables, can be periodically regenerated from the middle layer, wherein a determination can be made as to whether an accelerated table exists for a dataset table, and if so, then the accelerated table is used to process the query.

DETAILED DESCRIPTION

Figure 1:
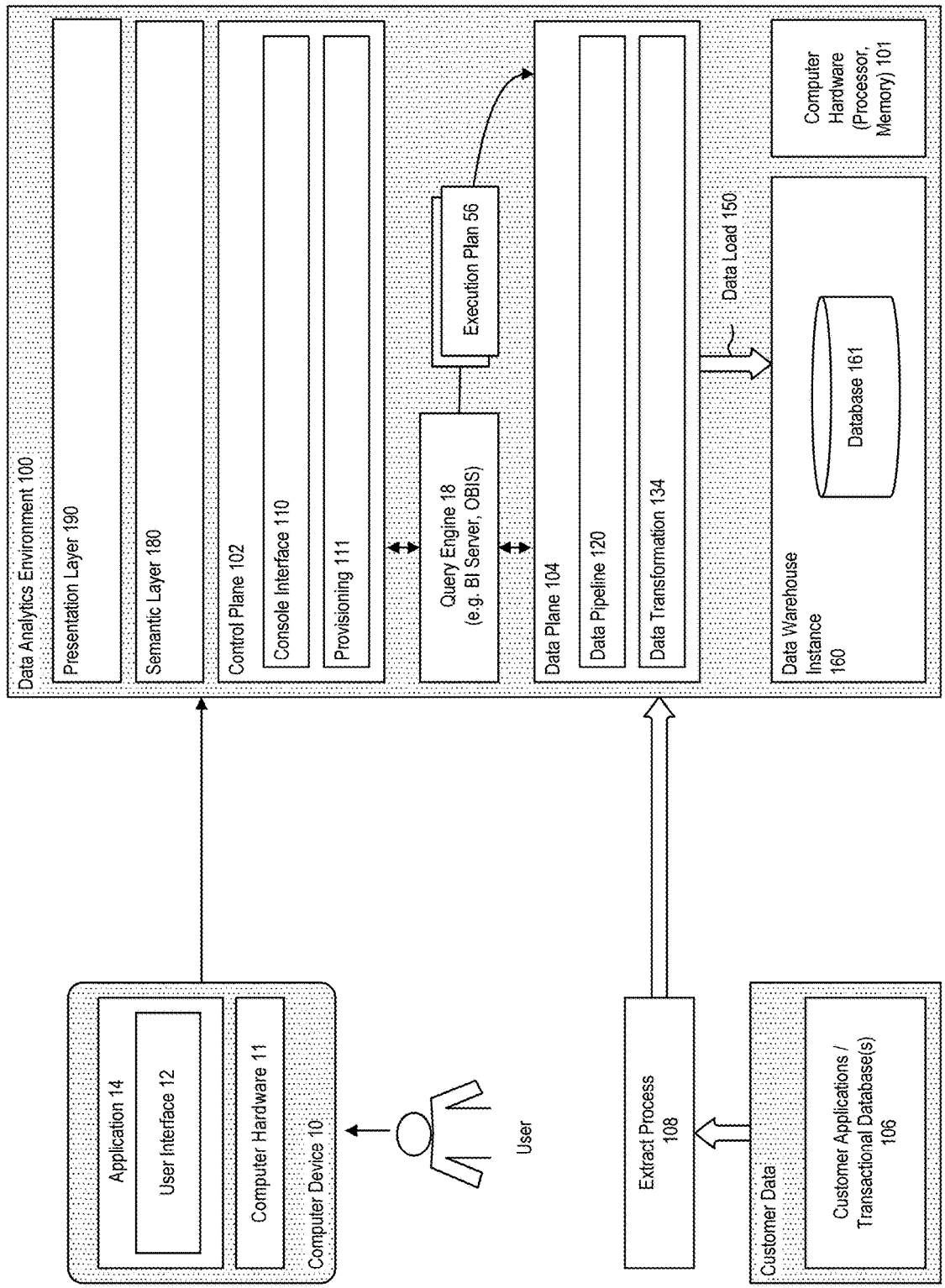
FIG. 1 illustrates an example data analytics environment, in accordance with an embodiment.

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Examples of such business intelligence tools/servers include Oracle Business Intelligence Applications (OBIA), Oracle Business Intelligence Enterprise Edition (OBIEE), or Oracle Business Intelligence Server (OBIS), which provide a query, reporting, and analysis server that can operate with a database to support features such as data mining or analytics, and analytic applications.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Introduction

In accordance with an embodiment, a data warehouse environment or component, such as, for example, an Oracle Autonomous Data Warehouse (ADVV), Oracle Autonomous Data Warehouse Cloud (ADWC), or other type of data warehouse environment or component adapted to store large amounts of data, can provide a central repository for storage of data collected by one or more business applications.

For example, in accordance with an embodiment, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example, an OBIS environment, or other type of BI component adapted to examine large amounts of data sourced either by the customer (tenant) itself, or from multiple third-party entities.

As another example, in accordance with an embodiment, the analytic applications environment can be used to pre-populate a reporting interface of a data warehouse instance with relevant metadata describing business-related data objects in the context of various business productivity software applications, for example, to include predefined dashboards, key performance indicators (KPIs), or other types of reports.

Data Analytics

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

FIG. 1 illustrates an example data analytics environment, in accordance with an embodiment.

The example embodiment illustrated in FIG. 1 is provided for purposes of illustrating an example of a data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a data analytics environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161, or other type of data source).

In accordance with an embodiment, the control plane operates to provide control for cloud or other software products offered within the context of a SaaS or cloud environment, such as, for example, an Oracle Analytics Cloud environment, or other type of cloud environment. For example, in accordance with an embodiment, the control plane can include a console interface 110 that enables access by a customer (tenant) and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the data analytics environment. The model format can be provided in any data format suited for storage in a data warehouse. In accordance with an embodiment, the data plane can also include a data and configuration user interface, and mapping and configuration database.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the data analytics schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

In accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, a customer may perform modifications to their data source model, to support their particular requirements, for example by adding custom facts or dimensions associated with the data stored in their data warehouse instance; and the system can extend the semantic model accordingly.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Business Intelligence Server

In accordance with an embodiment, a query engine 18 (e.g., an OBIS instance) operates in the manner of a federated query engine to serve analytical queries or requests from clients within, e.g., an Oracle Analytics Cloud environment, directed to data stored at a database.

In accordance with an embodiment, the OBIS instance can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query. In this way the OBIS instance translates business user queries into appropriate database-specific query languages (e.g., Oracle SQL, SQL Server SQL, DB2 SQL, or Essbase MDX). The query engine (e.g., OBIS) can also support internal execution of SQL operators that cannot be pushed down to the databases.

In accordance with an embodiment, a user/developer can interact with a client computer device 10 that includes a computer hardware 11 (e.g., processor, storage, memory), user interface 12, and application 14. A query engine or business intelligence server such as OBIS generally operates to process inbound, e.g., SQL, requests against a database model, build and execute one or more physical database queries, process the data appropriately, and then return the data in response to the request.

To accomplish this, in accordance with an embodiment, the query engine or business intelligence server can include various components or features, such as a logical or business model or metadata that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, a query engine or business intelligence server may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine (e.g., OBIS) can process queries against a database according to a query execution plan, that can include various child (leaf) nodes, generally referred to herein in various embodiments as RqLists, for example:

```
Execution plan:
 [[
 RqList <<191986>> [for database 0:0,0]
    D102.c1 as c1 [for database 0:0,0],
    sum(D102.c2 by [ D102.c1] ) as c2 [for database 0:0,0]
 Child Nodes (RqJoinSpec): <<192970>> [for database 0:0,0]
    RqJoinNode <<192969>> [ ]
    (
       RqList <<193062>> [for database 0:0,0]
          D2.c2 as c1 [for database 0:0,0],
          D1.c2 as c2 [for database 0:0,0]
       Child Nodes (RqJoinSpec): <<193065>> [for database 0:0,0]
          RqJoinNode <<193061>> [ ]
          (
             RqList <<192414>> [for database 0:0,118]
                T1000003.Customer_ID as c1 [for database 0:0,118],
                T1000003.TARGET as c2 [for database 0:0,118]
             Child Nodes (RqJoinSpec): <<192424>> [for database 0:0,118]
                RqJoinNode <<192423>> [ ]
                   [users/administrator/dv_joins/multihub/input::##dataTarget]
                      as T1000003
          ) as D1 LeftOuterJoin (Eager) <<192381>> On D1.c1 = D2.c1;
             actual join vectors: [ 0 ] = [ 0 ]
          (
             RqList <<192443>> [for database 0:0,0]
                D104.c1 as c1 [for database 0:0,0],
                nullifnotunique(D104.c2 by [ D104.c1] ) as c2 [for database 0:0,0]
             Child Nodes (RqJoinSpec): <<192928>> [for database 0:0,0]
                RqJoinNode <<192927>> [ ]
                (
                   RqList <<192852>> [for database 0:0,118]
                      T1000006.Customer_ID as c1 [for database 0:0,118],
                      T1000006.Customer_City as c2 [for database 0:0,118]
                   Child Nodes (RqJoinSpec): <<192862>> [for database 0:0,118]
                      RqJoinNode <<192861>> [ ]
                         [users/administrator/dv_joins/my_customers/input::data]
                            as T1000006
                ) as D104
             GroupBy: [ D104.c1] [for database 0:0,0] sort
             OrderBy: c1, Aggs:[ nullifnotunique(D104.c2 by [ D104.c1] ) ]
                [for database 0:0,0]
          ) as D2
       ) as D102
    GroupBy: [ D102.c1] [for database 0:0,0] sort
    OrderBy: c1 asc, Aggs:[ sum(D102.c2 by [ D102.c1] ) ] [for database 0:0,0]
```

Within a query execution plan, each execution plan component (RqList) represents a block of query in the query execution plan, and generally translates to a SELECT statement. An RqList may have nested child RqLists, similar to how a SELECT statement can select from nested SELECT statements.

In accordance with an embodiment, a query engine can talk to different databases, and for each of these use datasource-specific code generators. A typical strategy is to ship as much SQL execution to the database, by sending it as part of the physical query—this reduces the amount of information being returned to the OBIS server.

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via the ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
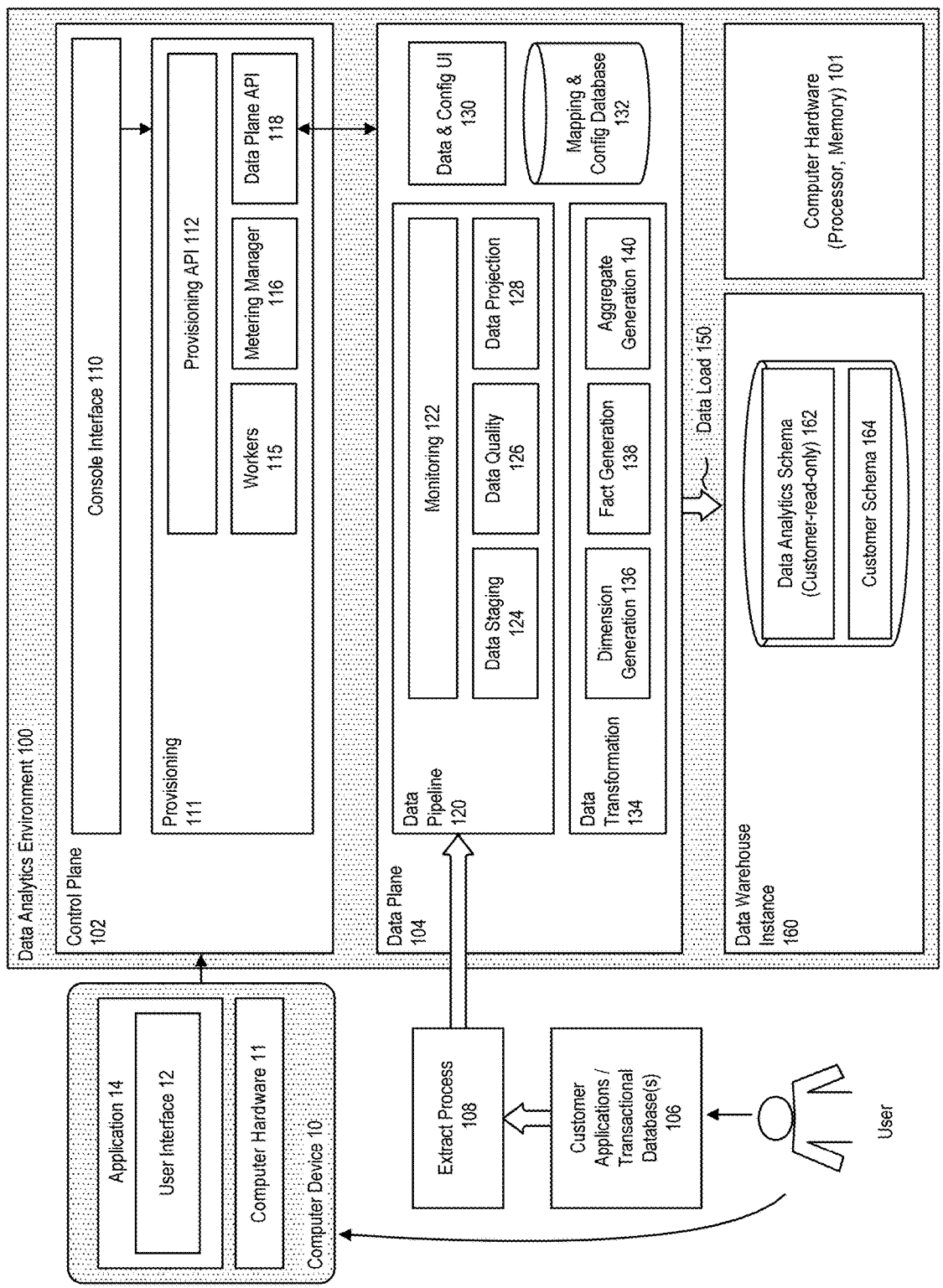
FIG. 2 further illustrates an example data analytics environment, in accordance with an embodiment.

FIG. 2 further illustrates an example data analytics environment, in accordance with an embodiment.

As illustrated in FIG. 2, in accordance with an embodiment, the provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the metering manager can include various functionality that meters services and usage of services provisioned through control plane. For example, in accordance with an embodiment, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default data analytics schema (referred to herein in accordance with some embodiments as an analytic warehouse schema) 162 and, for each customer (tenant) of the system, a customer schema 164.

In accordance with an embodiment, to support multiple tenants, the system can enable the use of multiple data warehouses or data warehouse instances. For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, based on the data model defined in the mapping and configuration database, the monitoring component can determine dependencies of several different datasets (data sets) to be transformed. Based on the determined dependencies, the monitoring component can determine which of several different datasets should be transformed to the model format first.

For example, in accordance with an embodiment, if a first model dataset incudes no dependencies on any other model dataset; and a second model dataset includes dependencies to the first model dataset; then the monitoring component can determine to transform the first dataset before the second dataset, to accommodate the second dataset's dependencies on the first dataset.

For example, in accordance with an embodiment, dimensions can include categories of data such as, for example, "name," "address," or "age". Fact generation includes the generation of values that data can take, or "measures." Facts can be associated with appropriate dimensions in the data warehouse instance. Aggregate generation includes creation of data mappings which compute aggregations of the transformed data to existing data in the customer schema of data warehouse instance.

In accordance with an embodiment, once any transformations are in place (as defined by the data model), the data pipeline or process can read the source data, apply the transformation, and then push the data to the data warehouse instance.

In accordance with an embodiment, data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure, to load the transformed data into the customer schema of the data warehouse instance. Subsequent to the loading of the transformed data into customer schema, the transformed data can be analyzed and used in a variety of additional business intelligence processes.

Figure 3:
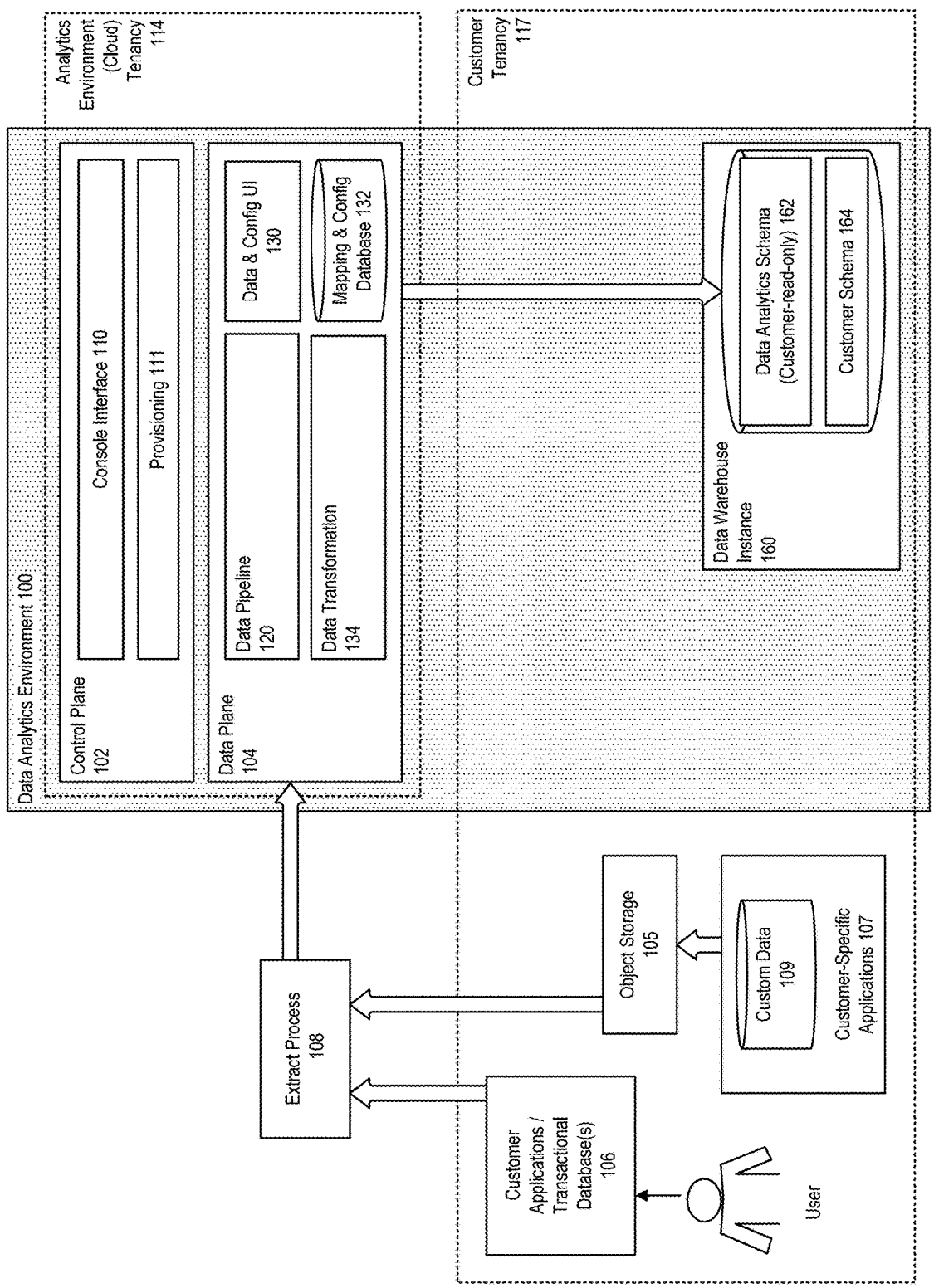
FIG. 3 further illustrates an example data analytics environment, in accordance with an embodiment.

FIG. 3 further illustrates an example data analytics environment, in accordance with an embodiment.

As illustrated in FIG. 3, in accordance with an embodiment, data can be sourced, e.g., from a customer's (tenant's) enterprise software application or data environment (106), using the data pipeline process; or as custom data 109 sourced from one or more customer-specific applications 107; and loaded to a data warehouse instance, including in some examples the use of an object storage 105 for storage of the data.

In accordance with embodiments of analytics environments such as, for example, Oracle Analytics Cloud (OAC), a user can create a dataset that uses tables from different connections and schemas. The system uses the relationships defined between these tables to create relationships or joins in the dataset.

In accordance with an embodiment, for each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that is readily modifiable by the customer, and which allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse (e.g., ADW) can include a data analytics schema and, for each customer/tenant, a customer schema sourced from their enterprise software application or data environment. The data provisioned in a data warehouse tenancy (e.g., an ADW cloud tenancy) is accessible only to that tenant; while at the same time allowing access to various, e.g., ETL-related or other features of the shared environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

In accordance with an embodiment, for a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Figure 4:
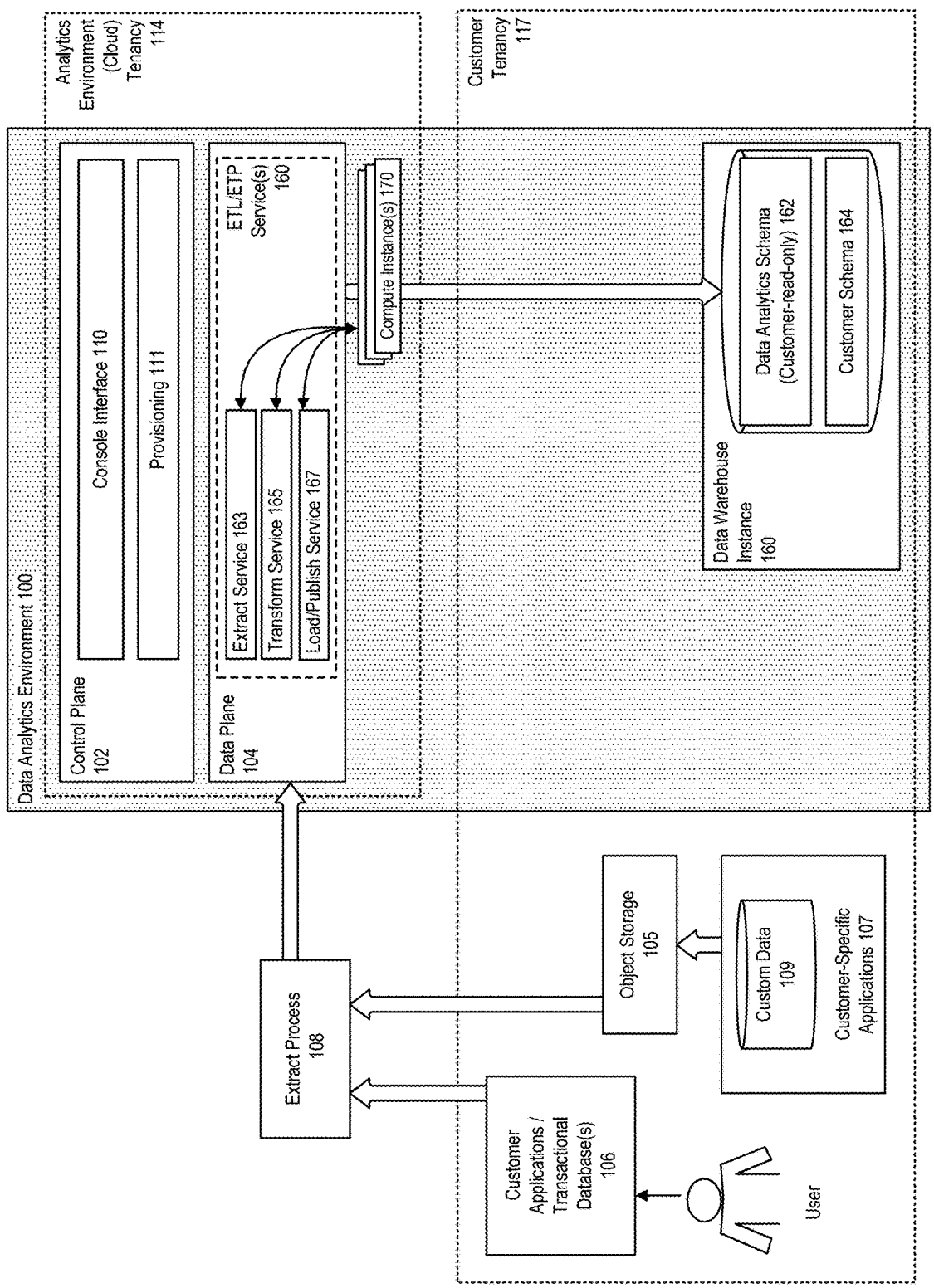
FIG. 4 further illustrates an example data analytics environment, in accordance with an embodiment.

FIG. 4 further illustrates an example data analytics environment, in accordance with an embodiment.

As illustrated in FIG. 4, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

For example, in accordance with an embodiment, a list of view objects for extractions can be submitted, for example, to an Oracle BI Cloud Connector (BICC) component via a REST call. The extracted files can be uploaded to an object storage component, such as, for example, an Oracle Storage Service (OSS) component, for storage of the data. The transformation process takes the data files from object storage component (e.g., OSS), and applies a business logic while loading them to a target data warehouse, e.g., an ADW database, which is internal to the data pipeline or process, and is not exposed to the customer (tenant). A load/publish service or process takes the data from the, e.g., ADW database or warehouse, and publishes it to a data warehouse instance that is accessible to the customer (tenant).

Figure 5:
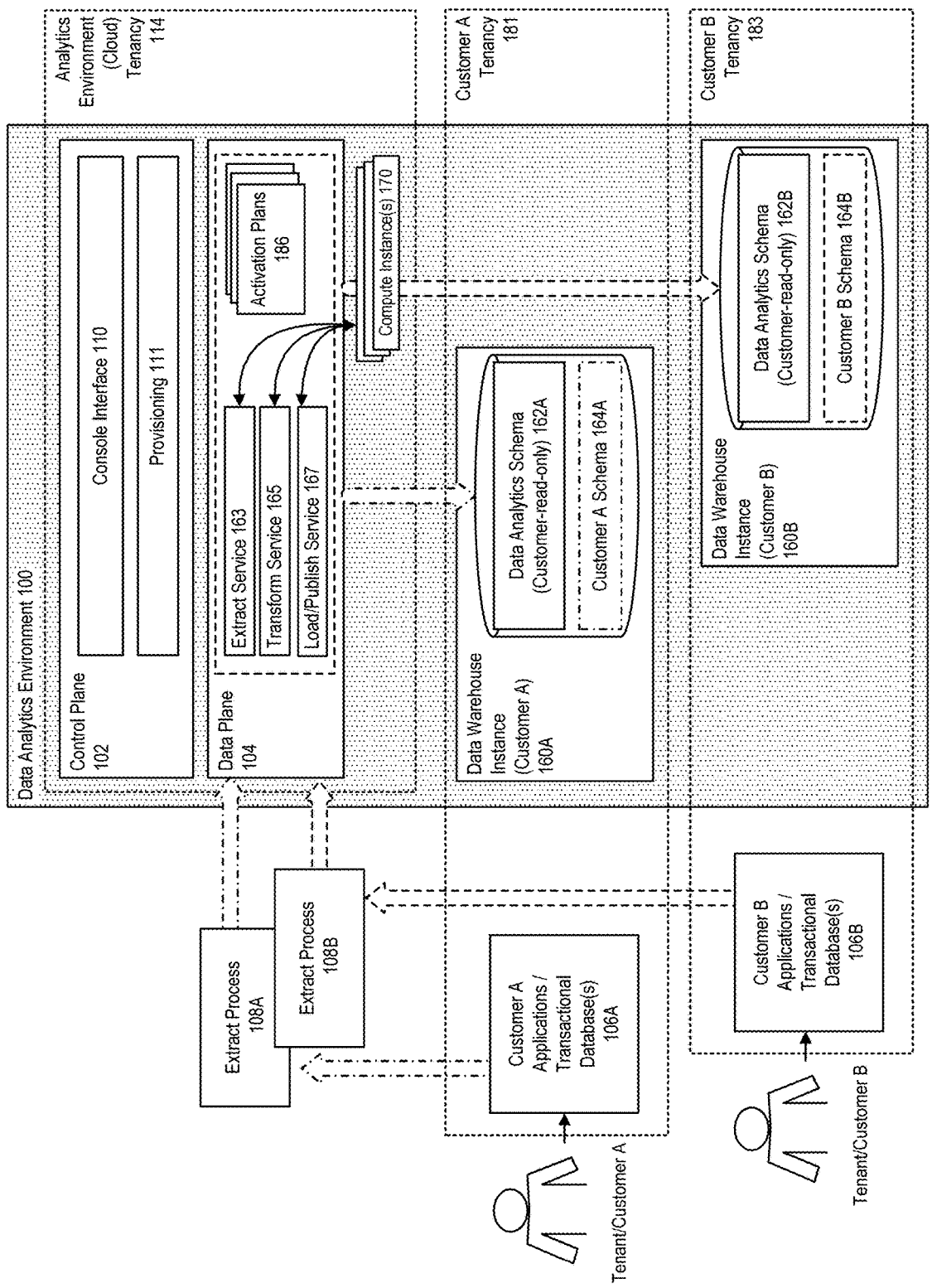
FIG. 5 further illustrates an example data analytics environment, in accordance with an embodiment.

FIG. 5 further illustrates an example data analytics environment, in accordance with an embodiment.

As illustrated in FIG. 5, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, a data analytics schema that is updated on a periodic basis, by the system in accordance with best practices for a particular analytics use case.

In accordance with an embodiment, for each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the data analytics environment also provides, for each of a plurality of customers of the environment, a customer schema (e.g., customer A schema 164A, customer B schema 164B) that is readily modifiable by the customer, and which allows the customer to supplement and utilize the data within their own data warehouse instance.

As described above, in accordance with an embodiment, for each of a plurality of customers of the data analytics environment, their resultant data warehouse instance operates as a database whose contents are partly-controlled by the customer; and partly-controlled by the data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs.

For example, in accordance with an embodiment, an activation plan can define a number of extract, transform, and load (publish) services or steps to be run in a certain order, at a certain time of day, and within a certain window of time.

In accordance with an embodiment, each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

Figure 6:
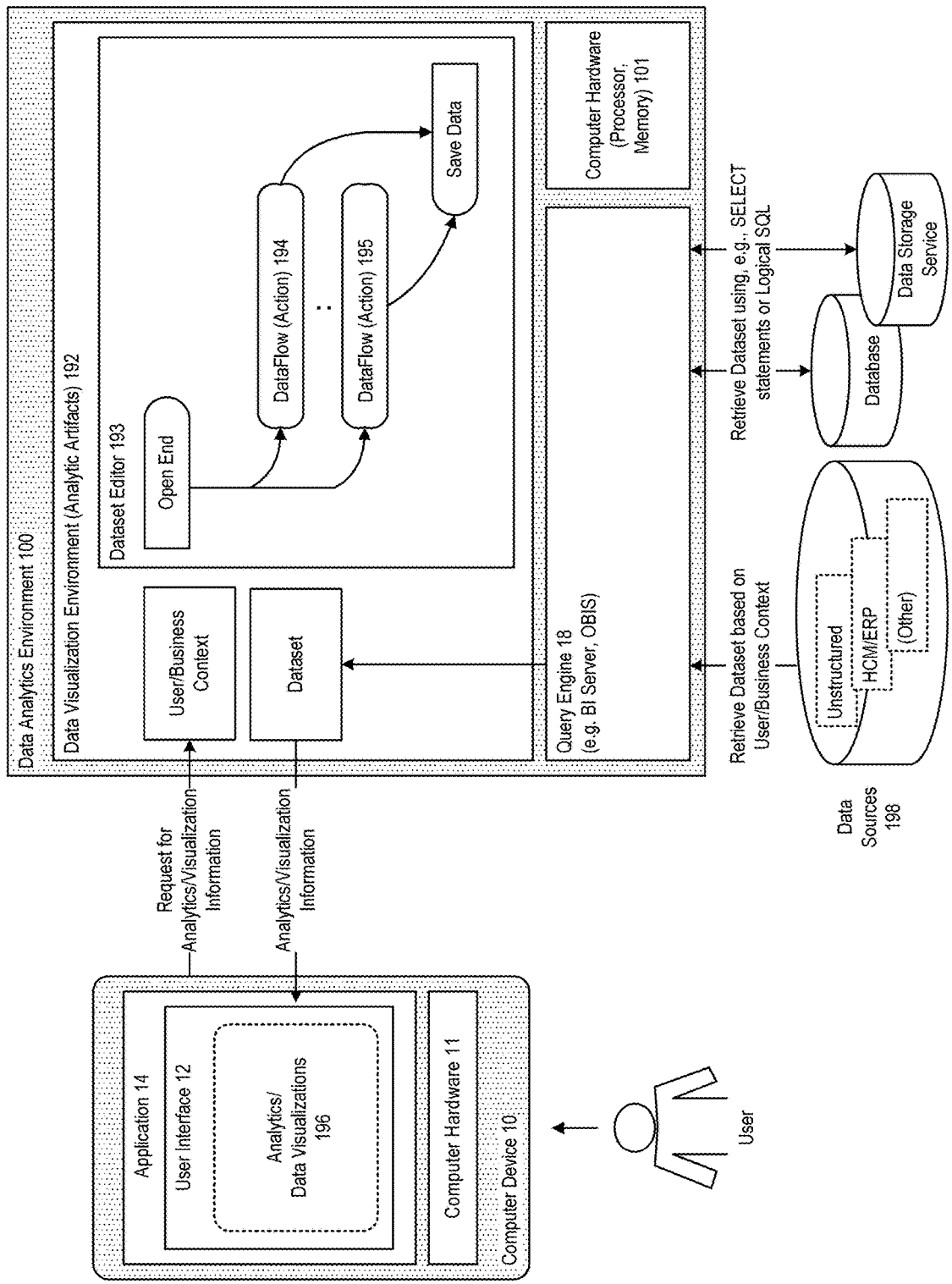
FIG. 6 illustrates a use of the system to transform, analyze, or visualize data, in accordance with an embodiment.

FIG. 6 illustrates a use of the system to transform, analyze, or visualize data, in accordance with an embodiment.

As illustrated in FIG. 6, in accordance with an embodiment, the systems and methods disclosed herein can be used to provide a data visualization environment 192 that enables insights for users of an analytics environment with regard to analytic artifacts and relationships among the same. A model can then be used to visualize relationships between such analytic artifacts via, e.g., a user interface, as a network chart or visualization of relationships and lineage between artifacts (e.g., User, Role, DV Project, Dataset, Connection, Dataflow, Sequence, ML Model, ML Script).

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the analytics system, or in the example of a cloud environment via a cloud service provided by the environment.

In accordance with an embodiment, the user interface can include or provide access to various dataflow action types, as described in further detail below, that enable self-service text analytics, including allowing a user to display a dataset, or interact with the user interface to transform, analyze, or visualize the data, for example to generate graphs, charts, or other types of data analytics or visualizations of dataflows.

In accordance with an embodiment, the analytics system enables a dataset to be retrieved, received, or prepared from one or more data source(s), for example via one or more data source connections. Examples of the types of data that can be transformed, analyzed, or visualized using the systems and methods described herein include HCM, HR, or ERP data, e-mail or text messages, or other of free-form or unstructured textual data provided at one or more of a database, data storage service, or other type of data repository or data source.

For example, in accordance with an embodiment, a request for data analytics or visualization information can be received via a client application and user interface as described above, and communicated to the analytics system (in the example of a cloud environment, via a cloud service). The system can retrieve an appropriate dataset to address the user/business context, for use in generating and returning the requested data analytics or visualization information to the client. For example, the data analytics system can retrieve a dataset using, e.g., SELECT statements or Logical SQL instructions.

In accordance with an embodiment, the system can create a model or dataflow that reflects an understanding of the dataflow or set of input data, by applying various algorithmic processes, to generate visualizations or other types of useful information associated with the data. The model or dataflow can be further modified within a dataset editor 193 by applying various processing or techniques to the dataflow or set of input data, including for example one or more dataflow actions 194, 195 or steps that operate on the dataflow or set of input data. A user can interact with the system via a user interface, to control the use of dataflow actions to generate data analytics, data visualizations 196, or other types of useful information associated with the data.

In accordance with an embodiment, datasets are self-service data models that a user can build for data visualization and analysis requirements. A dataset contains data source connection information, tables, and columns, data enrichments and transformations. A user can use a dataset in multiple workbooks and in dataflows.

In accordance with an embodiment, when a user creates and builds a dataset, they can, for example: choose between many types of connections or spreadsheets; create datasets based on data from multiple tables in a database connection, an Oracle data source, or a local subject area; or create datasets based on data from tables in different connections and subject areas.

For example, in accordance with an embodiment, a user can build a dataset that includes tables from an Autonomous Data Warehouse connection, tables from a Spark connection, and tables from a local subject area; specify joins between tables; and transform and enrich the columns in the dataset.

In accordance with an embodiment, additional artifacts, features, and operations associated with datasets can include, for example:

View available connections: a dataset uses one or more connections to data sources to access and supply data for analysis and visualization. A user list of connections contains the connections that they built and the connections that they have permission to access and use.

Create a dataset from a connection: when a user creates a dataset, they can add tables from one or more data source connections, add joins, and enrich data.

Add multiple connections to a dataset: a dataset can include more than one connection. Adding more connections allows a user to access and join all of the tables and data that they need to build the dataset. The user can add more connections to datasets that support multiple tables.

Create dataset table joins: joins indicate relationships between a dataset's tables. If the user is creating a dataset based on facts and dimensions and if joins already exist in the source tables, then joins are automatically created in the dataset. If the user is creating a dataset from multiple connections and schemas, then they can manually define the joins between tables.

In accordance with an embodiment, a user can use dataflows to create datasets by combining, organizing, and integrating data. Dataflows enable the user to organize and integrate data to produce curated datasets that either they or other users can visualize.

For example, in accordance with an embodiment, a user might use a dataflow to: Create a dataset; Combine data from different source; aggregate data; and train a machine learning model or apply a predictive machine learning model to their data.

In accordance with an embodiment, a dataset editor as described above allows a user to add actions or steps, wherein each step performs a specific function, for example, add data, join tables, merge columns, transform data, or save the data. Each step is validated when the user adds or changes it. When they have configured the dataflow, they can execute it to produce or update a dataset.

In accordance with an embodiment, a user can curate data from datasets, subject areas, or database connections. The user can execute dataflows individually or in a sequence. The user can include multiple data sources in a dataflow and specify how to join them. The user can save the output data from a dataflow in either a dataset or in a supported database type.

In accordance with an embodiment, additional artifacts, features, and operations associated with dataflows can include, for example:

Add columns: add custom columns to a target dataset.
Add data: add data sources to a dataflow. For example, if the user is merging two datasets, they add both datasets to the dataflow.
Aggregate: create group totals by applying aggregate functions; for example, count, sum, or average.
Branch: creates multiple outputs from a dataflow.
Filter: select only the data that the user is interested in.
Join: combine data from multiple data sources using a database join based on a common column.
Graph Analytics: perform geo-spatial analysis, such as calculating the distance or the number of hops between two vertices.

The above are provided by way of example; in accordance with an embodiment other types of steps can be added to a dataflow to transform a dataset or provide data analytics or visualizations.

Dataset Analyses and Visualizations

In accordance with an embodiment, the system provides functionality that allows a user to generate datasets, analyses, or visualizations for display within a user interface, for example to explore datasets or data sourced from multiple data sources.

FIGS. 7-18 illustrate various examples of user interfaces for use with a data analytics environment, in accordance with an embodiment.

The user interfaces and features shown in FIGS. 7-18 are provided by way of example, for purposes of illustration of the various features described herein; in accordance with various embodiments, alternative examples of user interfaces and features can be provided.

Figure 7:
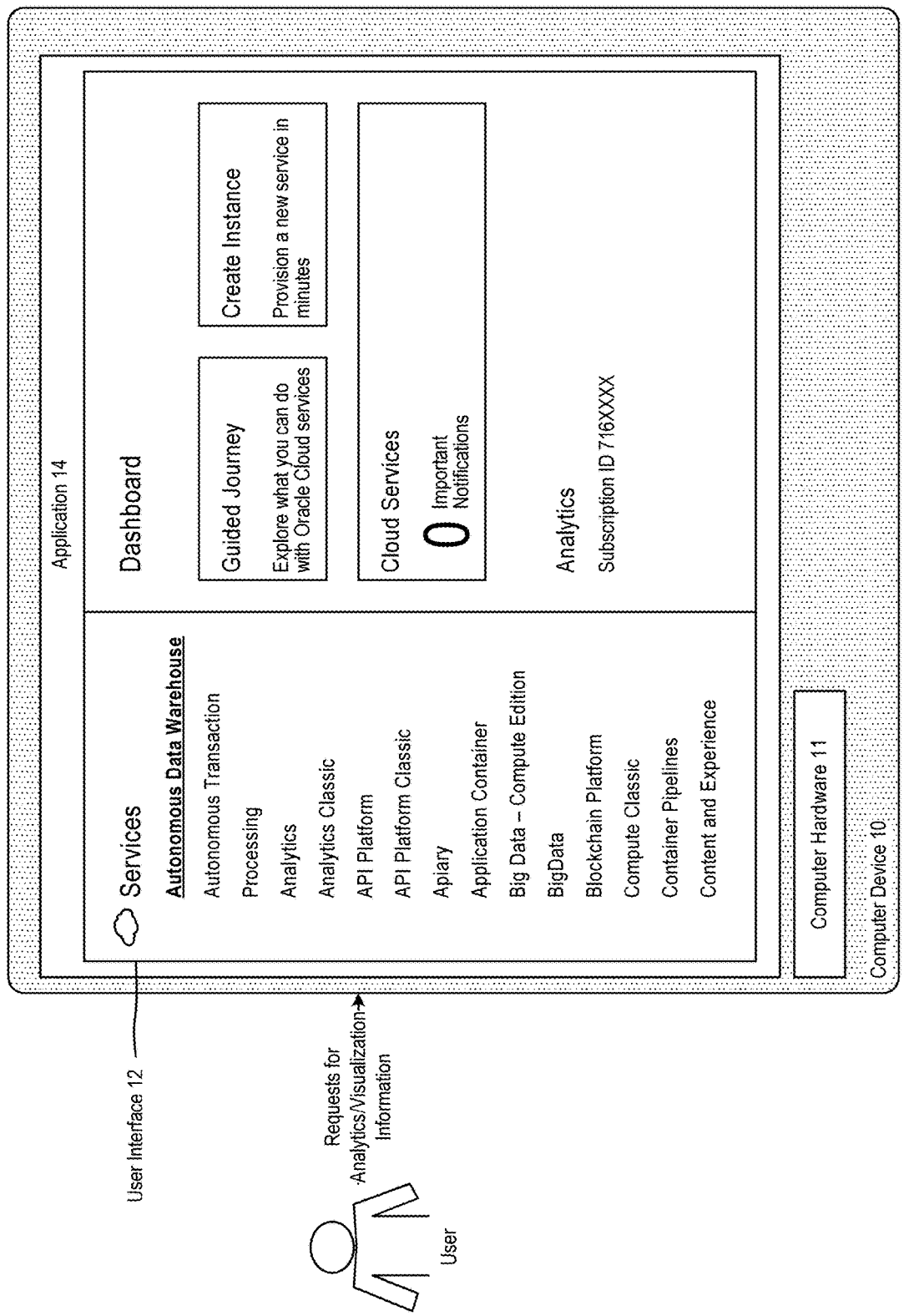
FIG. 7 illustrates various examples of user interfaces for use with a data analytics environment, in accordance with an embodiment.
Figure 8:
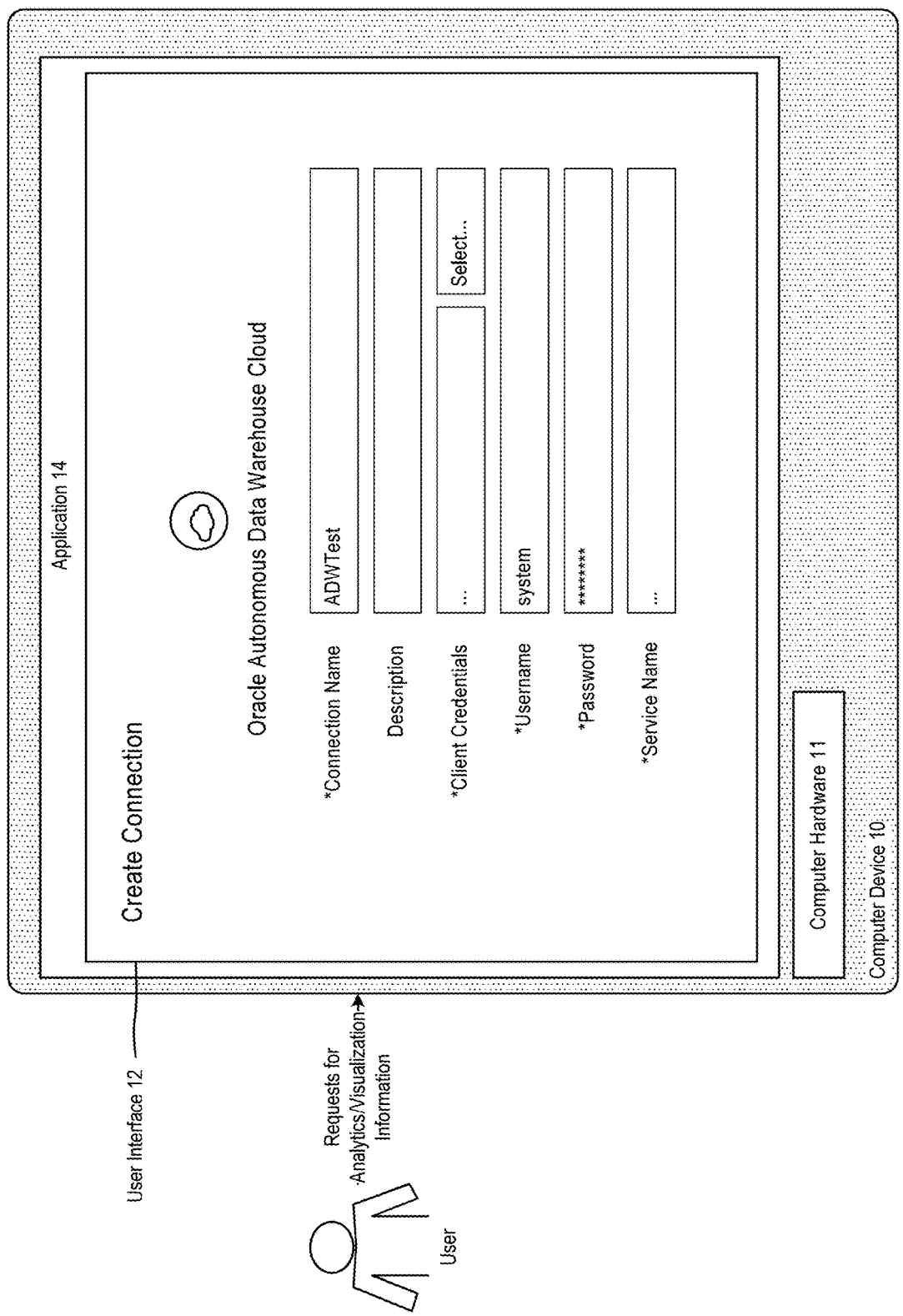
FIG. 8 illustrates various examples of user interfaces for use with a data analytics environment, in accordance with an embodiment.

As illustrated in FIGS. 7-8, in accordance with an embodiment, the user can access the data analytics environment, for example to submit analyses or queries against an organization's data.

For example, in accordance with an embodiment, the user can choose between various types of connections to create datasets based on data from tables in, e.g., a database connection, an Oracle subject area, an Oracle ADW connection, or a spreadsheet, file, or other type of data source. In this manner, a dataset operates as a self-service data model from which the user can build a data analysis or visualization.

Figure 9:
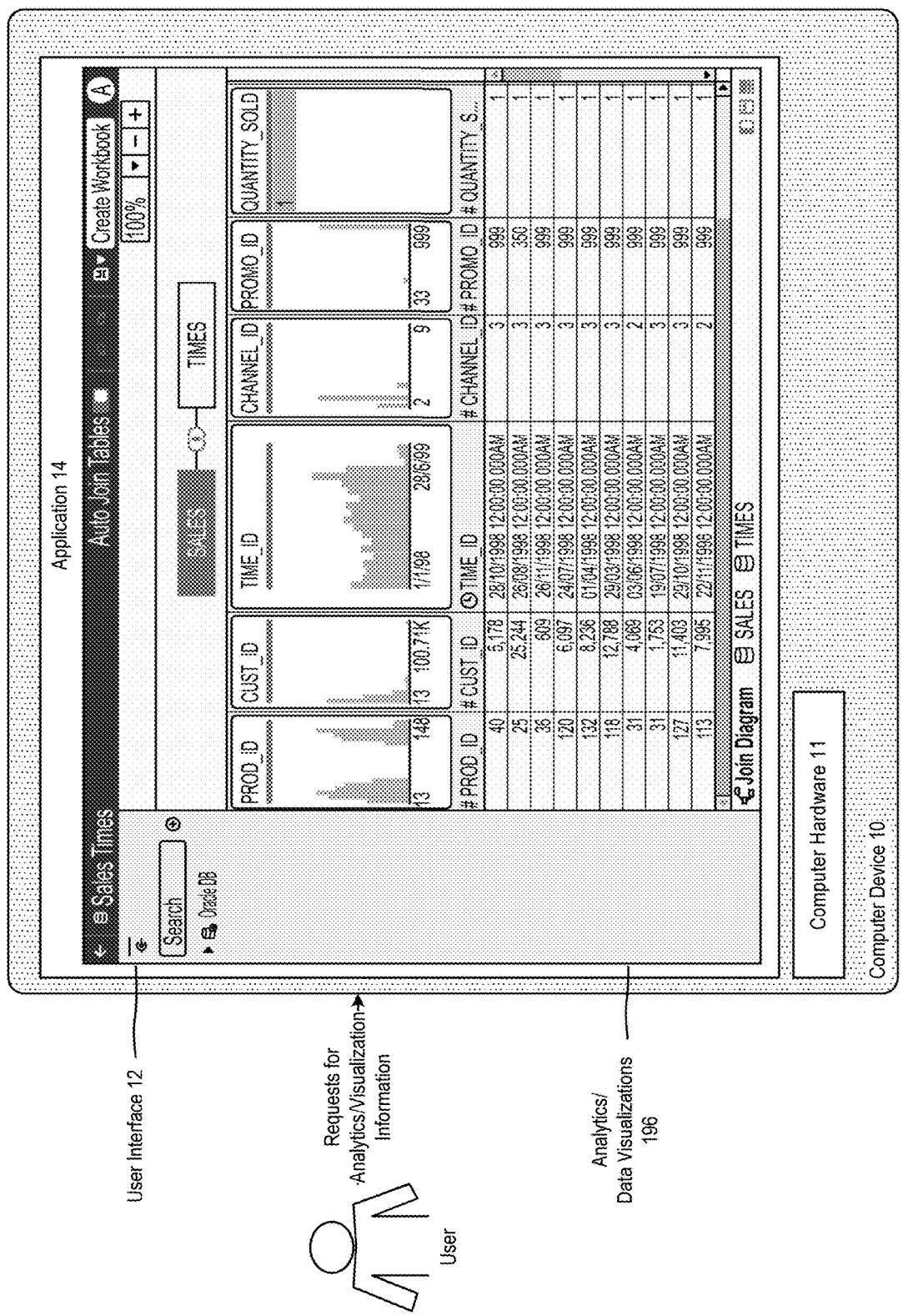
FIG. 9 illustrates various examples of user interfaces for use with a data analytics environment, in accordance with an embodiment.
Figure 10:
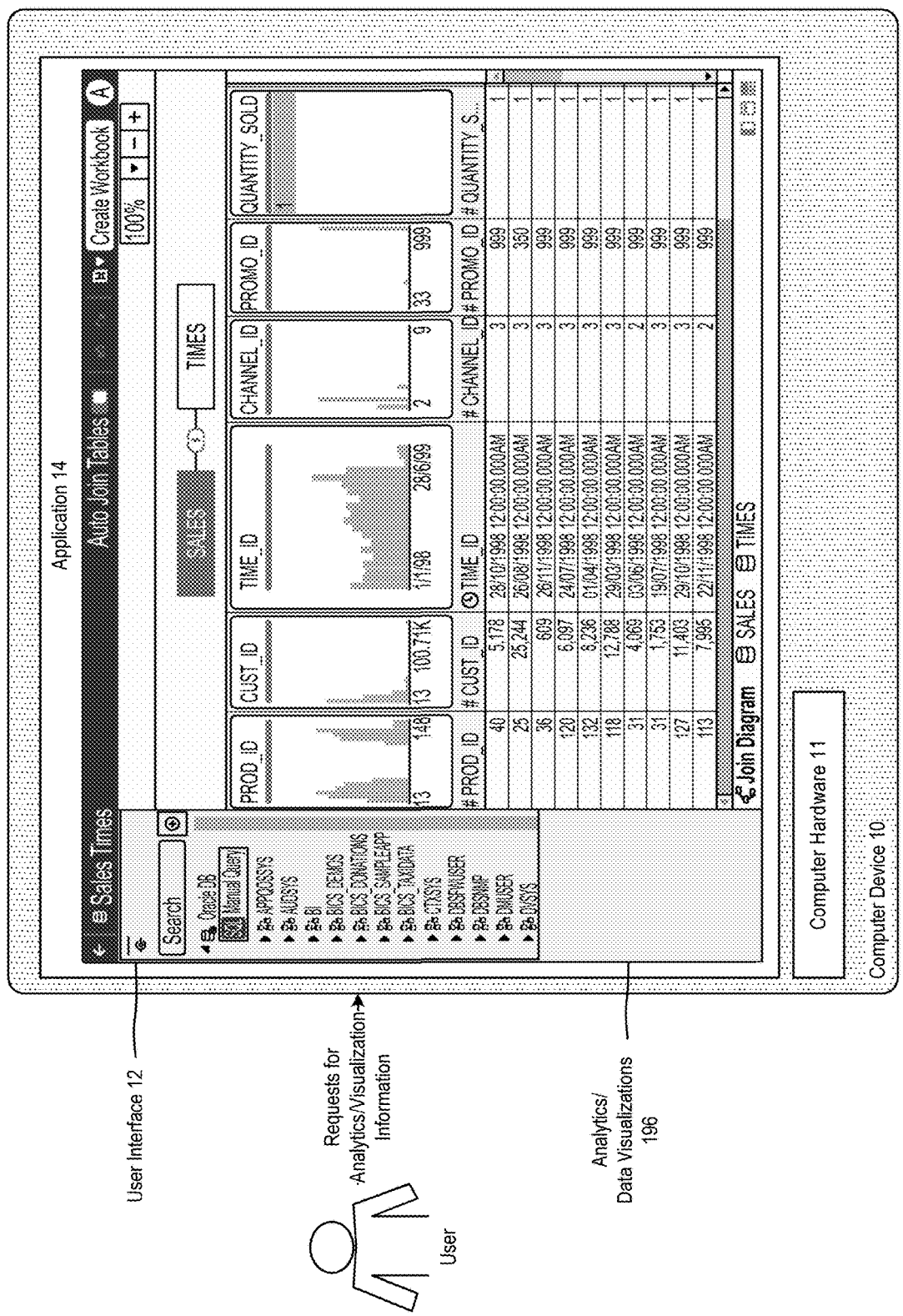
FIG. 10 illustrates various examples of user interfaces for use with a data analytics environment, in accordance with an embodiment.

As illustrated in FIGS. 9-10, in accordance with an embodiment, a dataset editor can display a list of connections which the user has permission to access, and allow the user to create or edit a dataset that includes tables, joins, and/or enriched data. The editor can display the data source connection's schemas and tables, from which the user can drag and drop to a dataset diagram. If a particular connection does not itself provide a schema and table listing the user can use a manual query for appropriate tables. Adding connections provide the ability to access and join their associated tables and data, to build the dataset.

Figure 11:
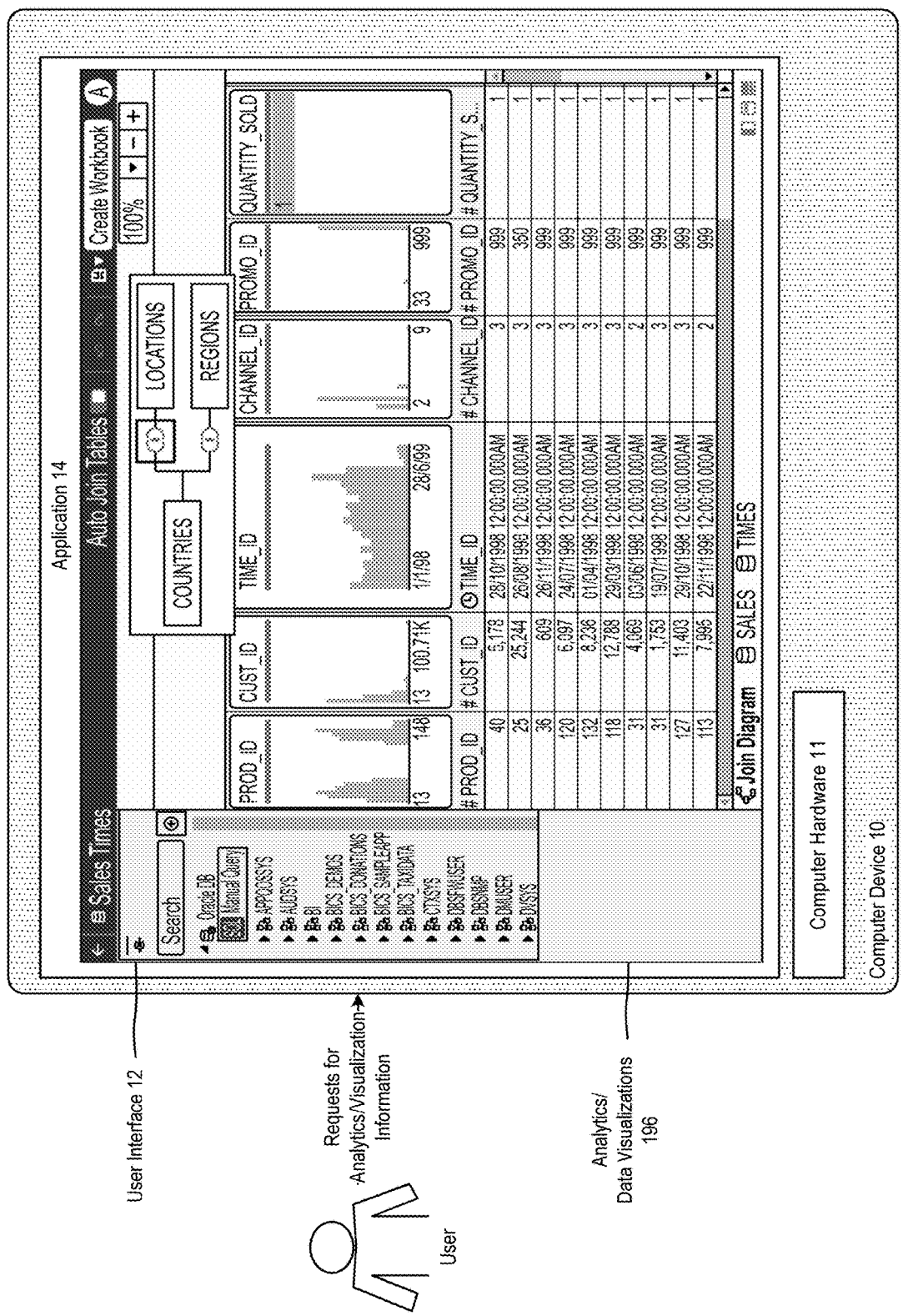
FIG. 11 illustrates various examples of user interfaces for use with a data analytics environment, in accordance with an embodiment.
Figure 12:
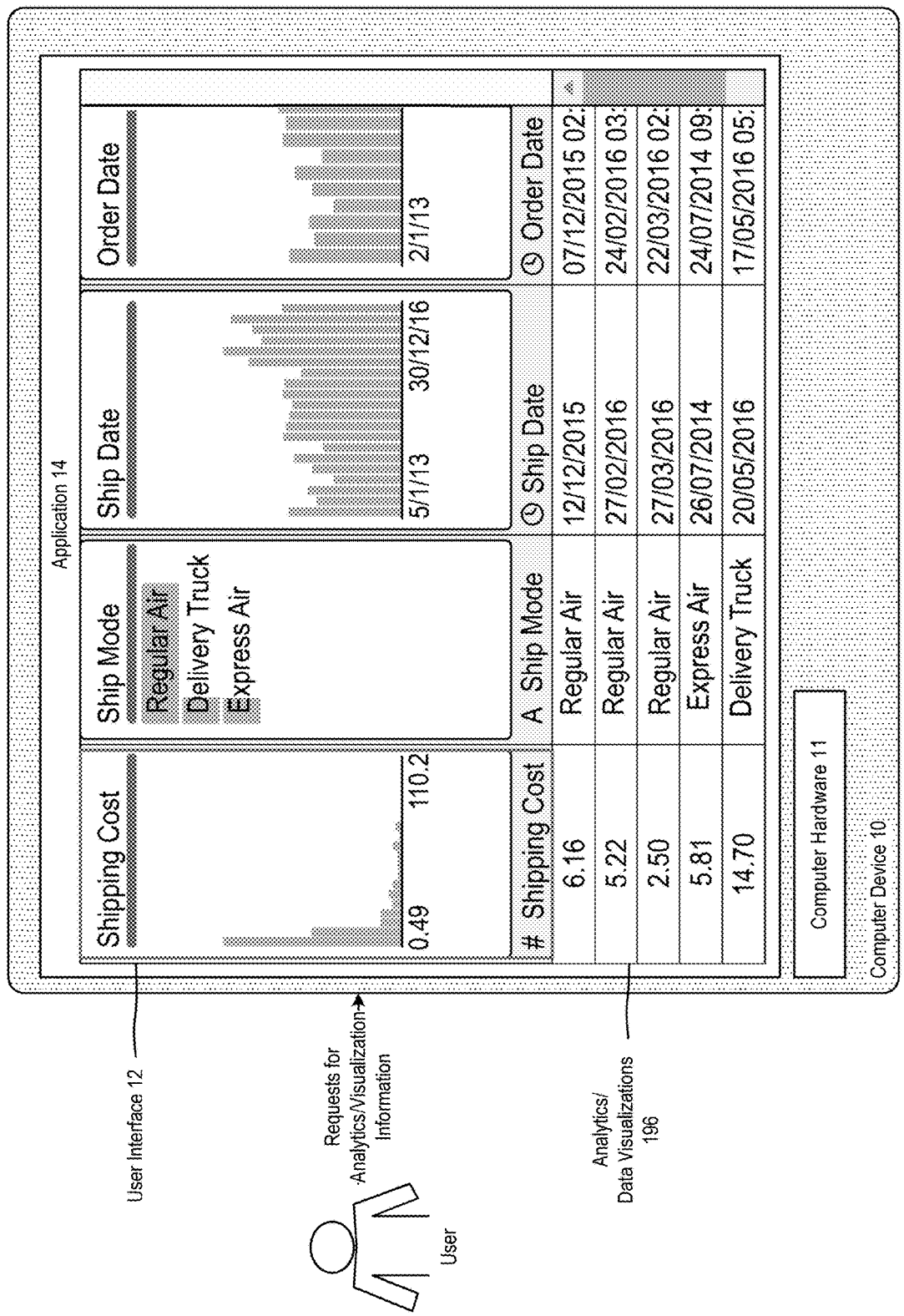
FIG. 12 illustrates various examples of user interfaces for use with a data analytics environment, in accordance with an embodiment.
Figure 13:
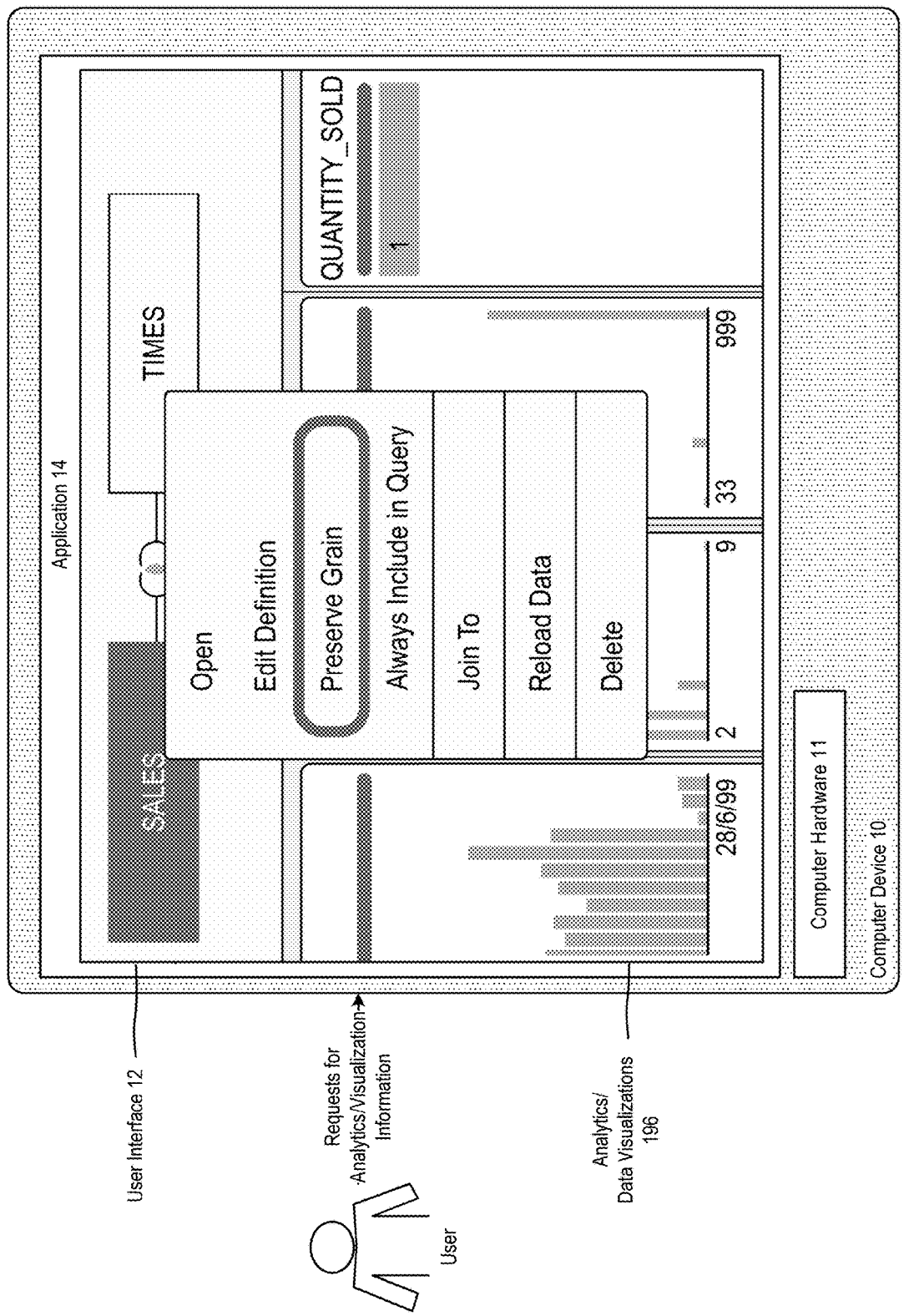
FIG. 13 illustrates various examples of user interfaces for use with a data analytics environment, in accordance with an embodiment.

As illustrated in FIGS. 11-12, in accordance with an embodiment, within the dataset editor a join diagram displays the tables and joins in a dataset. Joins that are defined in the data source can be automatically created between tables in the dataset, for example, by creating joins based on column name matches found between the tables.

In accordance with an embodiment, when the user selects a table, a preview data area displays a sample of the table's data. Displayed join links and icons indicate which tables are joined and the type of join used. The user can create a join by dragging and dropping one table onto another; click on a join to view or update its configuration; or click a column's type attribute to change its type, for example from a measure to an attribute.

In accordance with an embodiment, the system can generate source-specific optimized queries for a visualization, wherein a dataset is treated as a data model and only those tables needed to satisfy a visualization are used in the query.

By default a dataset's grain is determined by the table with the lowest grain. The user can create a measure in any table in a dataset; however, this can cause the measure on one side of a one-to-many or many-to-many relationship to be duplicated. In accordance with an embodiment illustrated in FIG. 13, to address this, the user can set the table on one side of a cardinality to preserve grain, to keep its level of detail.

Figure 14:
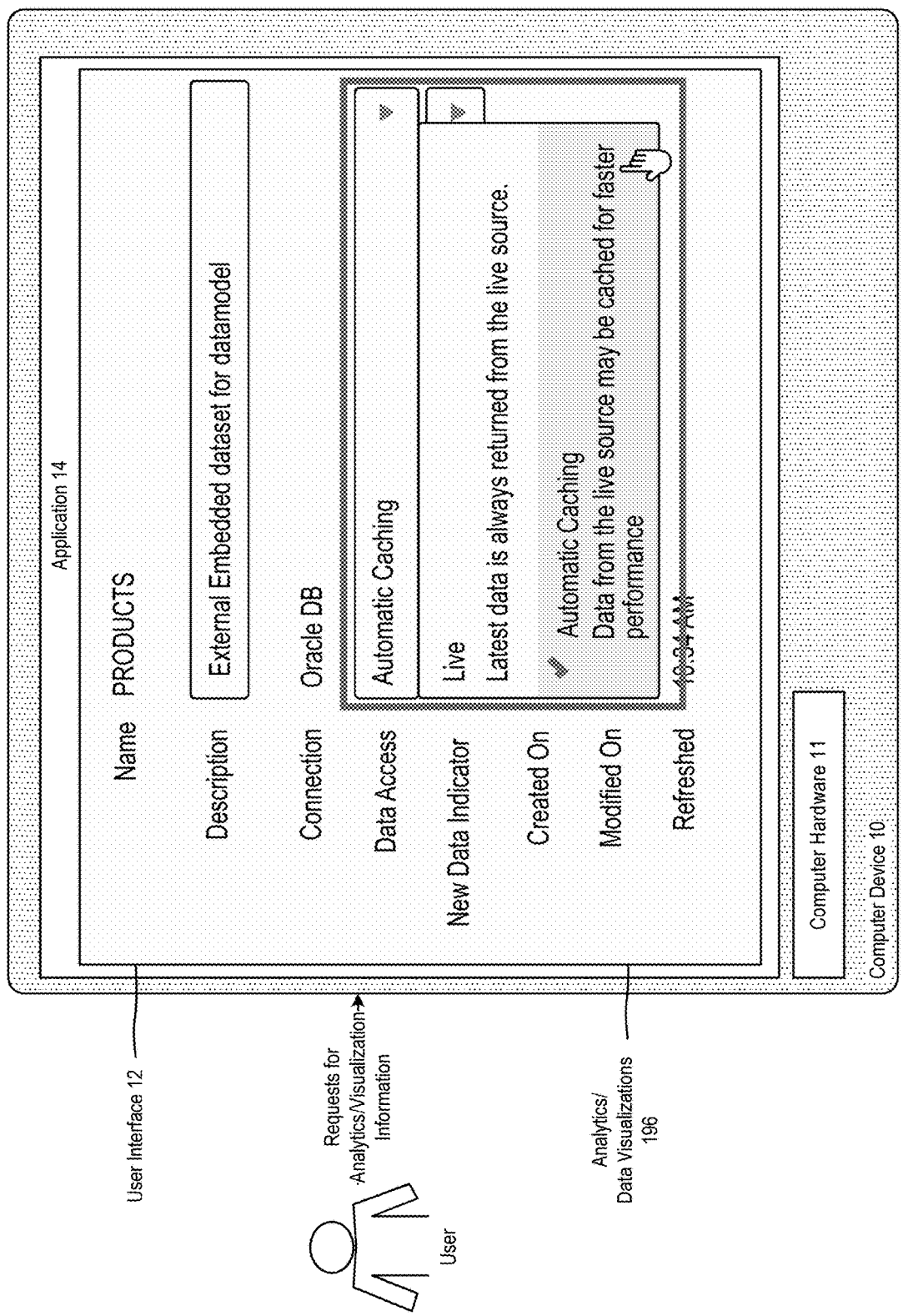
FIG. 14 illustrates various examples of user interfaces for use with a data analytics environment, in accordance with an embodiment.

As illustrated in FIG. 14, in accordance with an embodiment, dataset tables can be associated with a data access setting that determines if the system will load the table into cache, or alternatively if the table will receive its data directly from the data source.

In accordance with an embodiment, when automatic caching mode is selected for a table, the system loads or reloads the table data into cache, which provides faster performance when the table's data is refreshed, e.g., from a workbook, and causes the reload menu option to display at the table and dataset level.

In accordance with an embodiment, when live mode is selected for a table, the system retrieves the table data directly from the data source; and the source system manages the table's data source queries. This option is useful when the data is stored in a high-performance data warehouse such as, for example, Oracle ADW; and also ensures that the most-current data is used.

In accordance with an embodiment, when a dataset uses multiple tables, some tables can use automatic caching, while others can include live data. During reload of multiple tables using the same connection, if the reloading of data on one table fails, then any tables presently set to use automatic caching are switched to using live mode to retrieve their data.

In accordance with an embodiment, the system allows a user to enrich and transform their data before it is made available for analysis. When a workbook is created and a dataset added to it, the system performs column level profiling on a representative sample of the data. After profiling the data, the user can implement transformation and enrichment recommendations provided for recognizable columns in the dataset; such as, for example, GPS enrichments such as latitude and longitude for cities or zip codes.

In accordance with an embodiment, the data transformation and enrichment changes applied to a dataset affect the workbooks and dataflows that use the dataset. For example, when the user opens a workbook that shares the dataset, they receive a message indicating that the workbook uses updated or refreshed data.

In accordance with an embodiment, dataflows provide a means of organizing and integrating data to produce curated datasets that your users can visualize. For example, the user might use a dataflow to create a dataset, combine data from different sources, aggregate data, or train machine learning models or apply a predictive machine learning model to their data.

Figure 15:
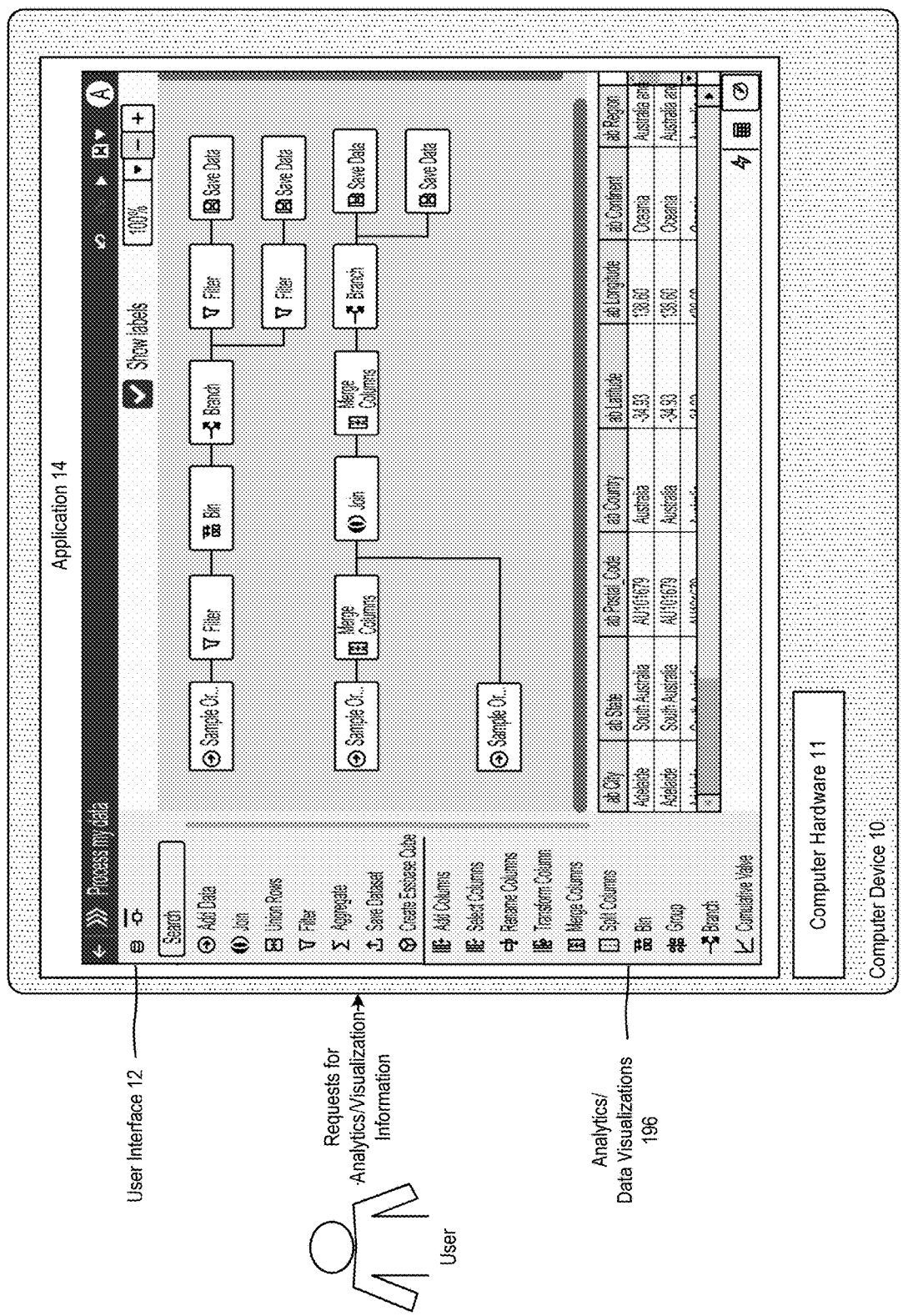
FIG. 15 illustrates various examples of user interfaces for use with a data analytics environment, in accordance with an embodiment.

As illustrated in FIG. 15, in accordance with an embodiment, within a dataflow each step performs a specific function, for example to add data, join tables, merge columns, transform data, or save data. Once configured, the dataflow can be executed to perform operations to produce or update a dataset, including for example the use of SQL operators, such as BETWEEN, LIKE, IN), conditional expressions, or functions.

In accordance with an embodiment, dataflows can be use merge datasets, cleanse data, and output the results to a new dataset. Dataflows can be executed individually or in a sequence. If any dataflow within a sequence fails, then all the changes made in the sequence are rolled back.

Figure 16:
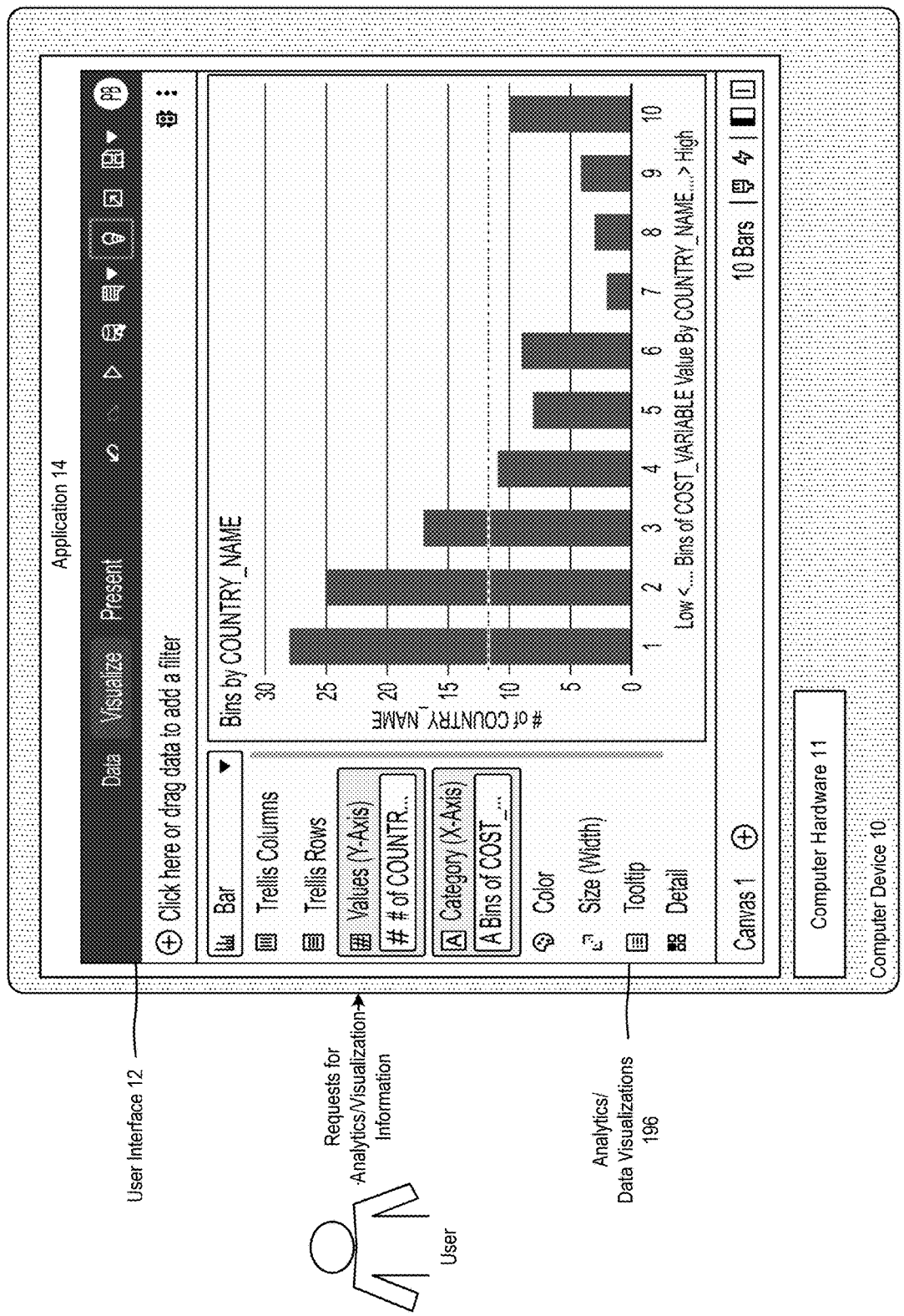
FIG. 16 illustrates various examples of user interfaces for use with a data analytics environment, in accordance with an embodiment.
Figure 17:
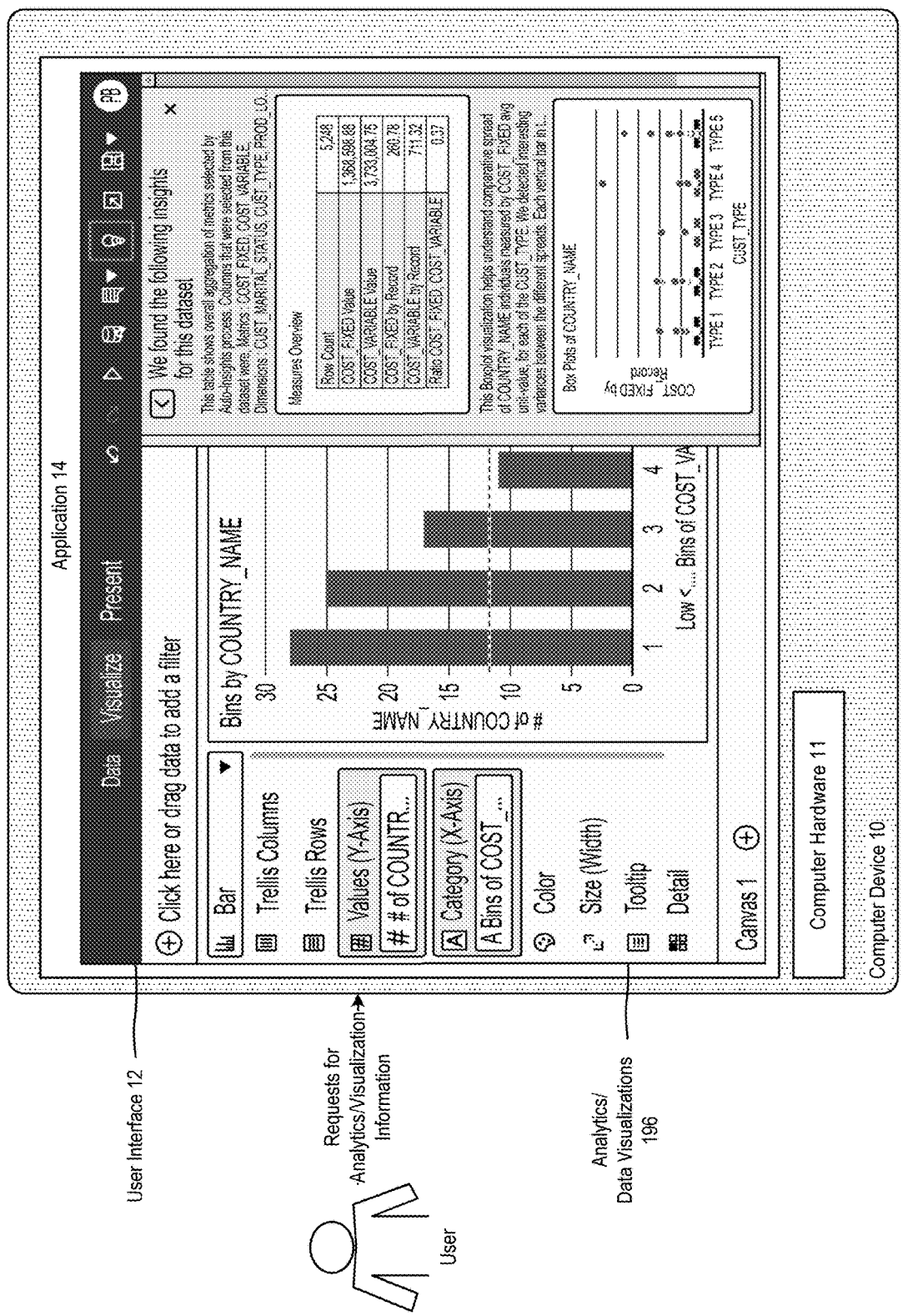
FIG. 17 illustrates various examples of user interfaces for use with a data analytics environment, in accordance with an embodiment.
Figure 18:
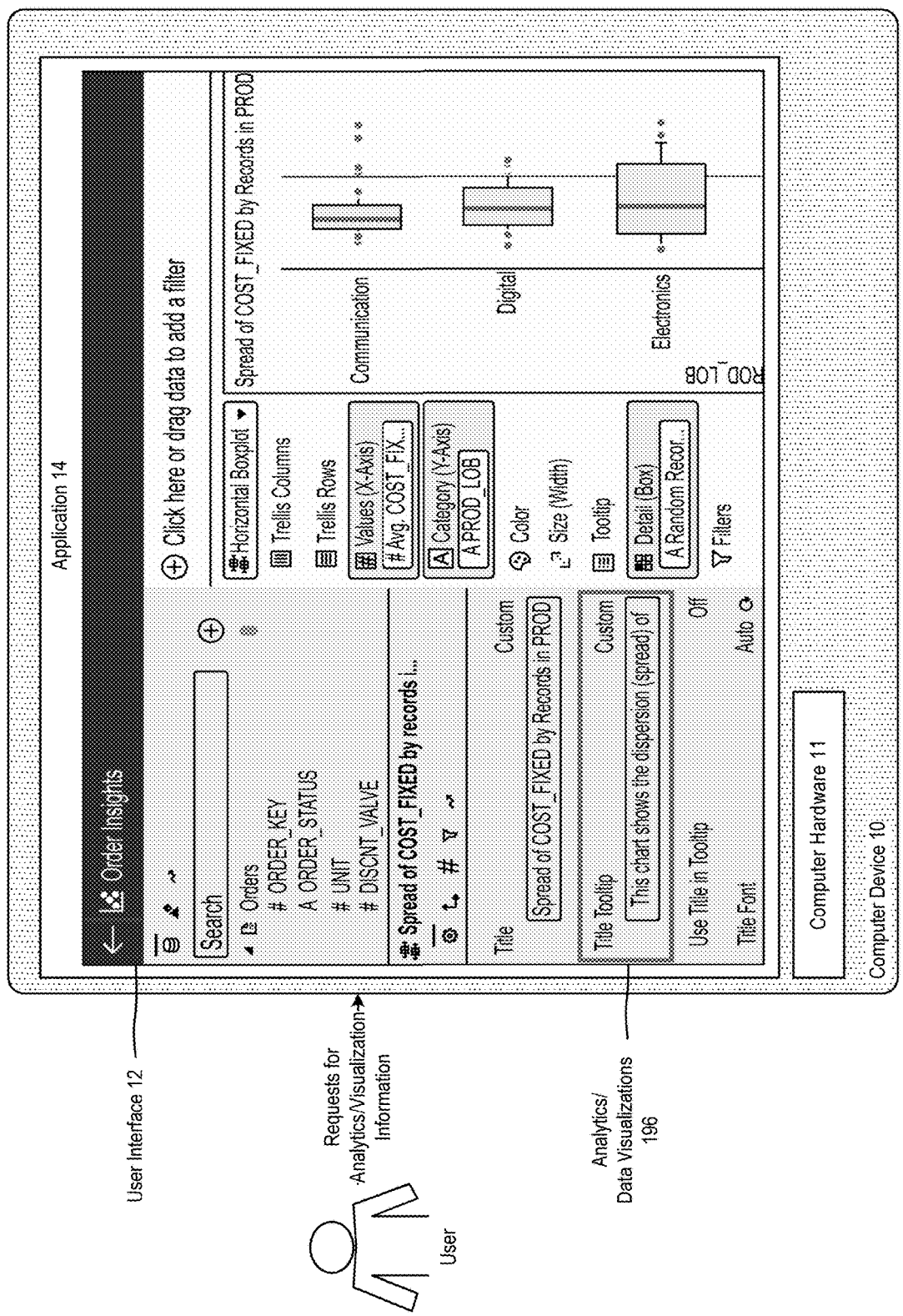
FIG. 18 illustrates various examples of user interfaces for use with a data analytics environment, in accordance with an embodiment.

As illustrated in FIGS. 16-18, in accordance with an embodiment, visualizations can be displayed within a user interface, for example to explore datasets or data sourced from multiple data sources, and to add insights.

For example, in accordance with an embodiment, the user can create a workbook, add a dataset, and then drag and drop its columns onto a canvas to create visualizations. The system can automatically generate a visualization based on the contents of the canvas, with one or more visualization types automatically selected for selection by the user. For example, if the user adds a revenue measure to the canvas, the data element may be placed in a values area of a grammar panel, and a Tile visualization type selected. The user can continue adding data elements directly to the canvas to build the visualization.

In accordance with an embodiment, the system can provide automatically generated data visualizations (automatically-generated insights, auto-insights), by suggesting visualizations which are expected to provide the best insights for a particular dataset. The user can review an insight's automatically generated summary, for example by hovering over the associated visualization in the workbook canvas.

Query Acceleration

In accordance with an embodiment, described herein is a system and method for providing query acceleration with a computing environment such as, for example, a business intelligence environment, database, data warehouse, or other type of environment that supports data analytics. A middle layer is provided as a long-term table data storage format; and one more acceleration formats, or acceleration tables, can be periodically regenerated from the middle layer, wherein a determination can be made as to whether an accelerated table exists for a dataset table, and if so, then the accelerated table is used to process the query.

In accordance with an embodiment, data intended for use as tables within the data analytics environment and dataset editor can be derived from various sources, such as for example accessing or receiving data from relational databases, data sources based on ODBC/JDBC connections such as SaaS data sources, or cloud service environments such as Oracle Service Cloud.

When defining a data set, a user can add one or more tables from these various sources that will then form a base for analyses or queries, or generating data visualizations. For example, a user may select initially a first set of tables from Sales, Customers, and Products data sources; and then select additional related tables from these or other sources as desired.

In environments which do not use query acceleration or accelerated tables for query processing, a typical approach to processing a query directed to one or more datasets may include, for example, receiving the original query from a user; accessing a data source; retrieving the dataset, and applying any business rules as transformations—each time the system processes that query (or function-ships the query to the data source).

However, this approach generally requires a substantial amount of data accessing, retrieving, and processing, coupled with increased resource usage and a longer time to generate data analytics.

In accordance with an embodiment, when query acceleration or accelerated tables are provided for use with a dataset, the system can apply transformations or enrichments to the query sent to the data source (for example, an ADW environment), such that required transformations or enrichments are incorporated into the query.

The information received from the data source can then be stored or cached in an interim format, for example in memory, and includes not only the underlying data, but additionally the transformed/enriched dataset required for an analysis or responding to the query.

Figure 19:
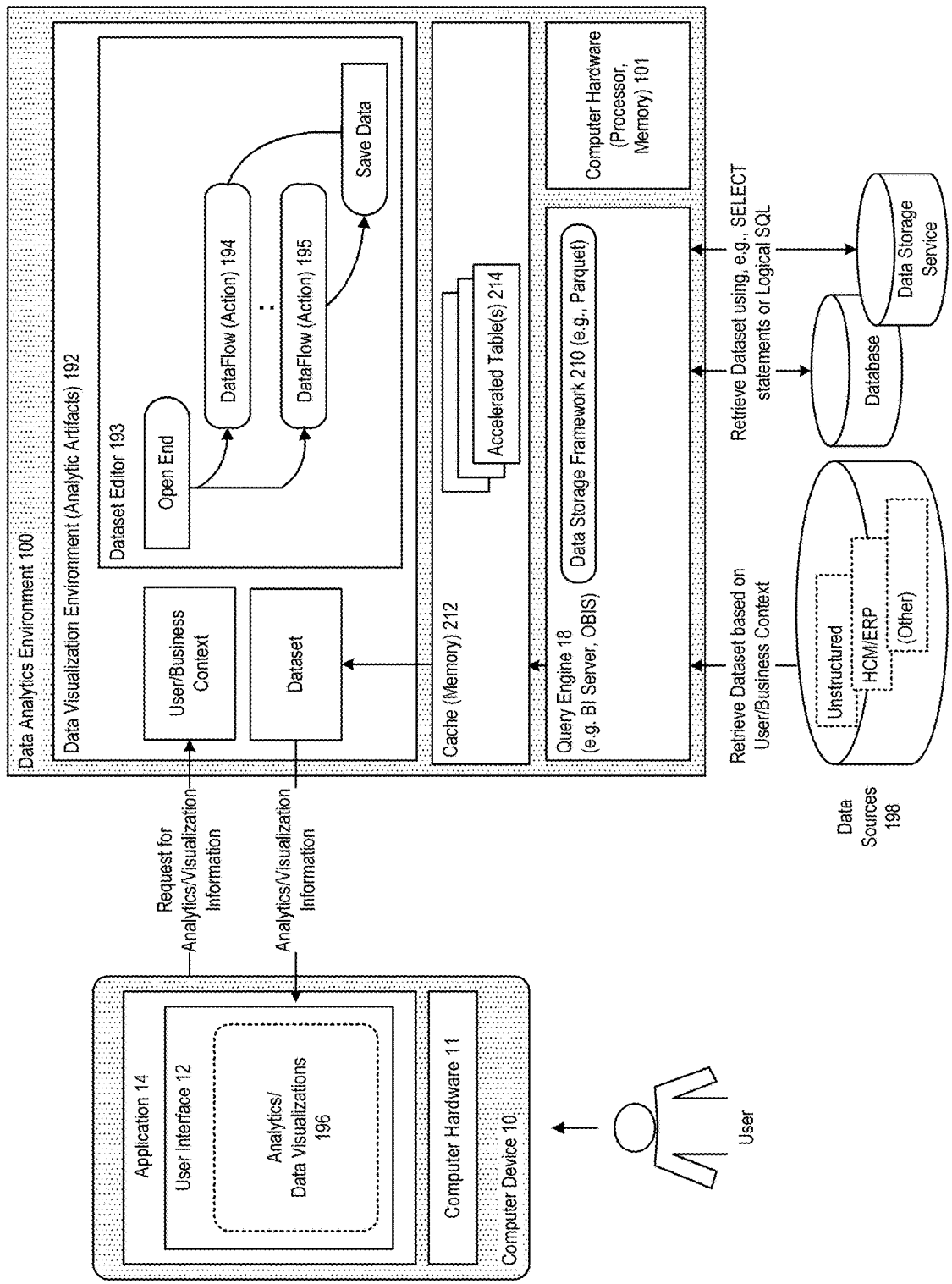
FIG. 19 illustrates the use of query acceleration with a data analytics environment, in accordance with an embodiment.

FIG. 19 illustrates the use of query acceleration with a data analytics environment, in accordance with an embodiment.

As illustrated in FIG. 19, in accordance with an embodiment, a query engine (e.g., a BI instance, for example an OBIS instance) comprises a data storage framework 210, for example an Apache Parquet component, and operates in association with a cache (memory) 212, to store one or more accelerated tables 214, for use with accessing or receiving datasets and responding to analyses or queries against an organization's data.

In accordance with an embodiment, the system can operate in combination with, e.g., RPD data models, as described above. Additionally/alternatively the user can upload other types of datasets, e.g., to an OAC environment, as an Excel spreadsheet, CSV file, or other type of data input, for use with query acceleration.

Figure 22:
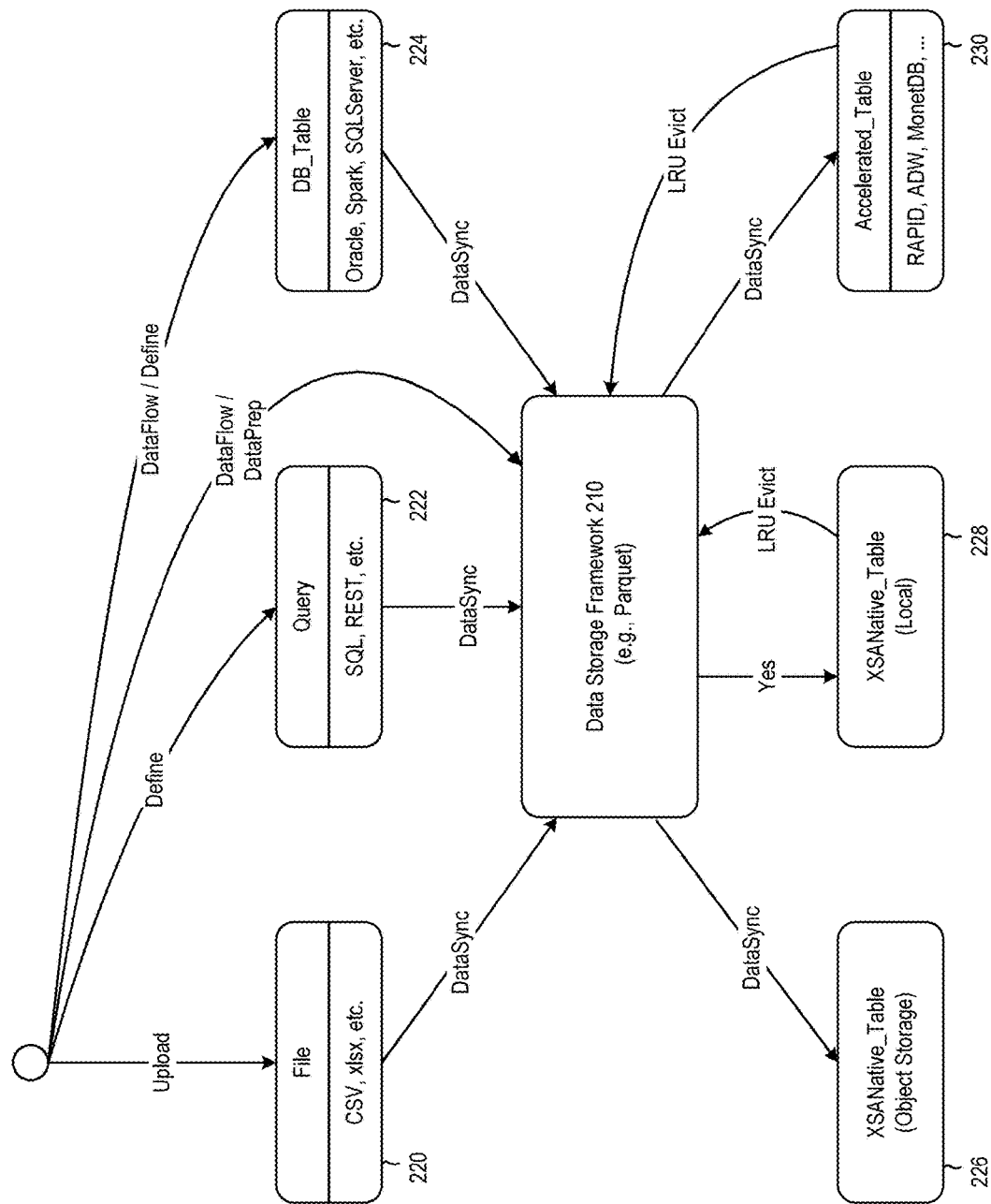
FIG. 22 illustrates a dataset lifecycle or state diagram for use in providing query acceleration, in accordance with an embodiment.

A dataset lifecycle (for example as illustrated in FIG. 22 and further described below) operates to access or receive the dataset, provided by the user/customer, and cache the dataset at a high-performance external query engine or external query accelerator (XQA) which provides access to the accelerated tables.

In accordance with an embodiment that uses ADW as a component of the data analytics environment, the ADW component itself provides a query engine that can be used as the query accelerator, with the datasets stored as accelerated tables either in flash memory, or as in-memory representation.

In accordance with an embodiment, a dataflow can be used to populate a dataset into the query accelerator as accelerated tables. For example in an OAC/ADW environment, the user can use a reload functionality provided within OAC and its dataset editor, to cause the system to access/ receive the latest dataset, load the data into ADW in an acceleration format, and update a metadata associated therewith to indicate that the dataset has been stored, in effect cached, as accelerated tables.

In accordance with an embodiment, the query generation process can then automatically modify a request/query from a user, for example to generate a data visualization, to instead use an accelerated table (Accelerated_table) for queries on that dataset.

For example, if an accelerated table is present within the cache/memory, the system can send the query to the external query accelerator (e.g., BI engine) which can perform various data transforms or processing steps. If there is no accelerated table present within the cache/memory (or it cannot be accessed for some reason), then the system can fall back to using a native table (XSANative table (local)), e.g., using a columnar or file-based query process.

In this manner, the acceleration process operates to push the dataset query to a relatively-faster engine (using an accelerated table) where available, and then fallback to its native capabilities (using a native table) when necessary. Situations requiring such fallback may arise due to, for example, a system failure or timeout, or any other reason that the external query accelerator cannot handle the query.

Figure 20:
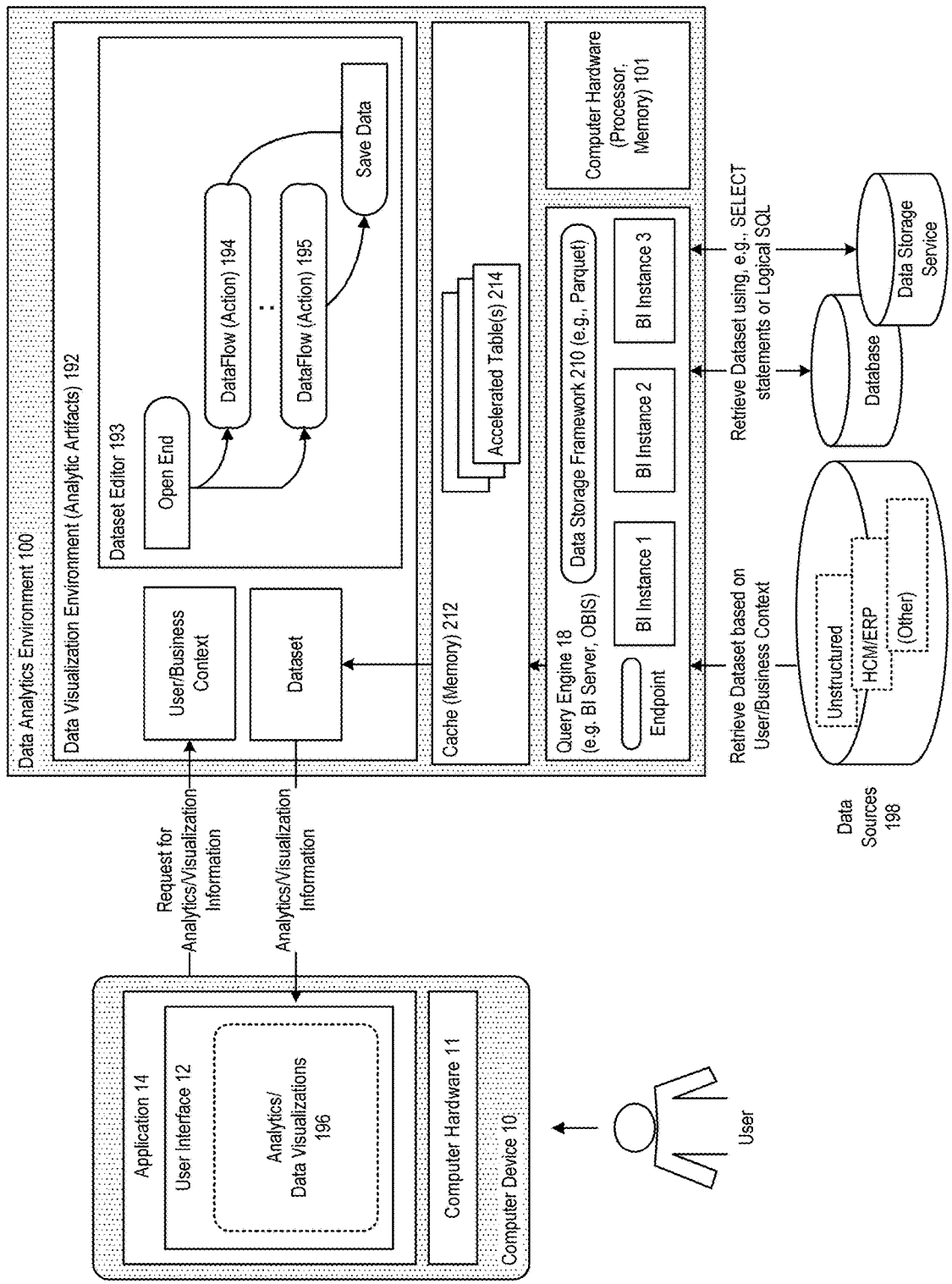
FIG. 20 further illustrates the use of query acceleration, in accordance with an embodiment.

FIG. 20 further illustrates the use of query acceleration, in accordance with an embodiment.

As illustrated in FIG. 20, in accordance with an embodiment, a query engine (e.g., a BI instance, OBIS instance) may comprise several nodes (e.g., OBIS nodes), some of which may be referencing the same table, in order to respond to analyses or queries.

In accordance with an embodiment, to provide consistency in data access, the system can manage or coordinate the use of those tables by the various nodes. For example, tables may have to be manually pinned and unpinned in memory, as a distributed form of least-recently-used (LRU) process. If a particular table is not being used across the cluster, it is a candidate for removal, but if any of the nodes are using the table then it should be retained in cache/memory for the present time.

Figure 21:
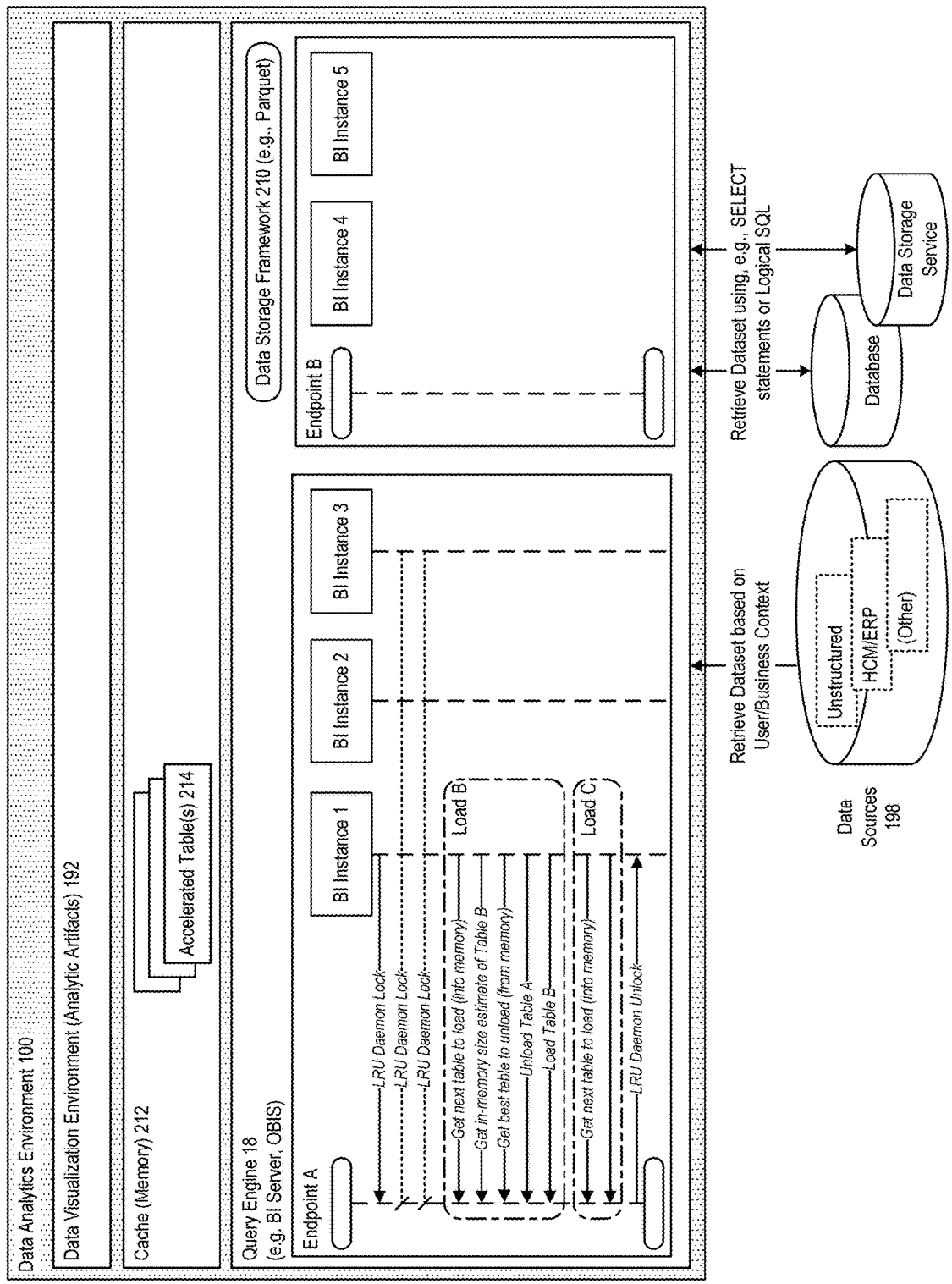
FIG. 21 further illustrates the use of query acceleration, in accordance with an embodiment.

FIG. 21 further illustrates the use of query acceleration, in accordance with an embodiment.

As illustrated in FIG. 21, in accordance with an embodiment and the example illustrated therein, a plurality of query engine or BI instances (e.g., a multitenant BI environment) share a single endpoint, e.g., a RAPID endpoint.

For example, as illustrated in FIG. 21, a plurality of query engine or BI instances 1, 2, 3 share one endpoint A; while another plurality of query engine or BI instances 4, 5 share another endpoint B. The sharing can be determined by various factors, such as for example, service level or available capacity. In an OAC environment, a plurality of OAC or BI nodes can be mapped to e.g. RAPID endpoints.

In accordance with an embodiment of an LRU process, when a first query engine or BI instance (user) acquires a lock on a particular table, other BI instances (users) may attempt to acquire a lock but fail. The first BI instance/user can determine whether to promote the table to memory or release the lock.

For example, as illustrated in FIG. 21, each of the Load B, Load D, and Load F accesses represent different datasets that can be loaded into memory. An LRU process daemon lock operates as a global lock to evict the least recently used table, or the one that has not been used in the most time.

In accordance with an embodiment, an advantage of using an environment such as OAC/ADW includes the availability of additional, e.g., machine learning (ML) libraries, provided by those environments. For example, additional machine learning features provided by OAC/ADW can be used to detect anomalies in data, for example attrition, clustering, or regression.

In accordance with various embodiments, additional features of the LRU process can include:

The XSA caching is "global". Cohort nodes can hit previously cached dataset by other nodes. The LRU process is agnostic as to the external engine used.

There is no single LRU manager; instead the responsibility of management is distributed across the query engine nodes (e.g., OBIS instances) sharing an endpoint. Each BI node or instance runs a daemon thread that periodically attempts to load and unload dataset depending on current outstanding requests. When a BI node connects to multiple endpoints it can run multiple daemon threads, one for each endpoint.

There is only one active daemon at a time. The LRU state and concurrency is managed via a set of bookkeeping tables (e.g., maintained in MySQL), including for example:

Request queue—a list of outstanding request and their arrival time. The daemons process this table starting with the oldest requests.

In_memory_tables—the list of tables that are currently in memory along with their in-memory size and last accessed time Daemon lock—the currently executing daemon alone with its last-alive time. Only one entry (i.e. daemon) is permitted at a particular time. The last-alive time is used to track daemons that may have crashed etc.

Loads are idempotent—if a table is already loaded into memory this results in a no-op. If it is desired to force re-load a table (e.g. data changes) the user can explicitly unload and (re) load that table.

If multiple BI nodes request the same table, those multiple request will be queued in the request queue table. Since the above applies; only one daemon can perform loads and unloads—this guarantees there is no contention during LRU management.

FIG. 22 illustrates a dataset lifecycle or state diagram for use in providing query acceleration, in accordance with an embodiment.

As illustrated in FIG. 22, in accordance with an embodiment, a dataset lifecycle or state diagram describes, using a layered approach, the various form factors a single dataset proceeds through while processing a query.

The initial state (indicated here as a circle) represents the state when the dataset does not exist; and the labels on the arcs represent the operation, process, or module that acts on the dataset, e.g., when a dataflow creates a new dataset in a Parquet format, from several other datasets.

In accordance with an embodiment, as illustrated in FIG. 22:

A top layer (220, 222, 224) operates as the "canonical" data format for the dataset, the particular format of which may depend on the dataset usage or how it is queried, for example file-based, query-based, or database table.

A data storage framework 210 (e.g., Parquet) operates as a middle layer that provides a long-term table data storage format for the dataset. Components such as Parquet may provide advantages over other formats in being relatively stable.

A bottom layer (226, 228, 230) holds one or more acceleration formats for the dataset. For purposes of acceleration, the acceleration formats are assumed or treated as being unreliable for use as long-term formats, and so are periodically regenerated from the middle layer, for example during disaster recovery, when the XSA Native format changes, or when the external acceleration engine is switched.

In accordance with an embodiment, the primary query acceleration can be provided via an external query or other type of data analytics query engine.

The XSA Native format is provided as a fallback for use in situations when the primary query engine fails, for example due to connectivity, stability, maintenance, or performance reasons.

The XSA Native (local) is provided for use at times when the XSA Native (object storage) file is not yet ready. To provide concurrency, a data synchronization component (DataSync) can be provided to convert and deposit XSA Native files into object storage.

In accordance with various embodiments, the LRU process may operate differently for different external query or other type of data analytics engines. For example, for an in-memory analytics engine such as Oracle RAPID, eviction may be only from in-memory; while for an InnoDB engine the tables on disk in MySQL may be preserved; while a MonetDB may completely remove the table from its catalog.

FIG. 23-26 illustrate query flows for various types of datasets, for use in providing query acceleration, in accordance with an embodiment.

Figure 23:
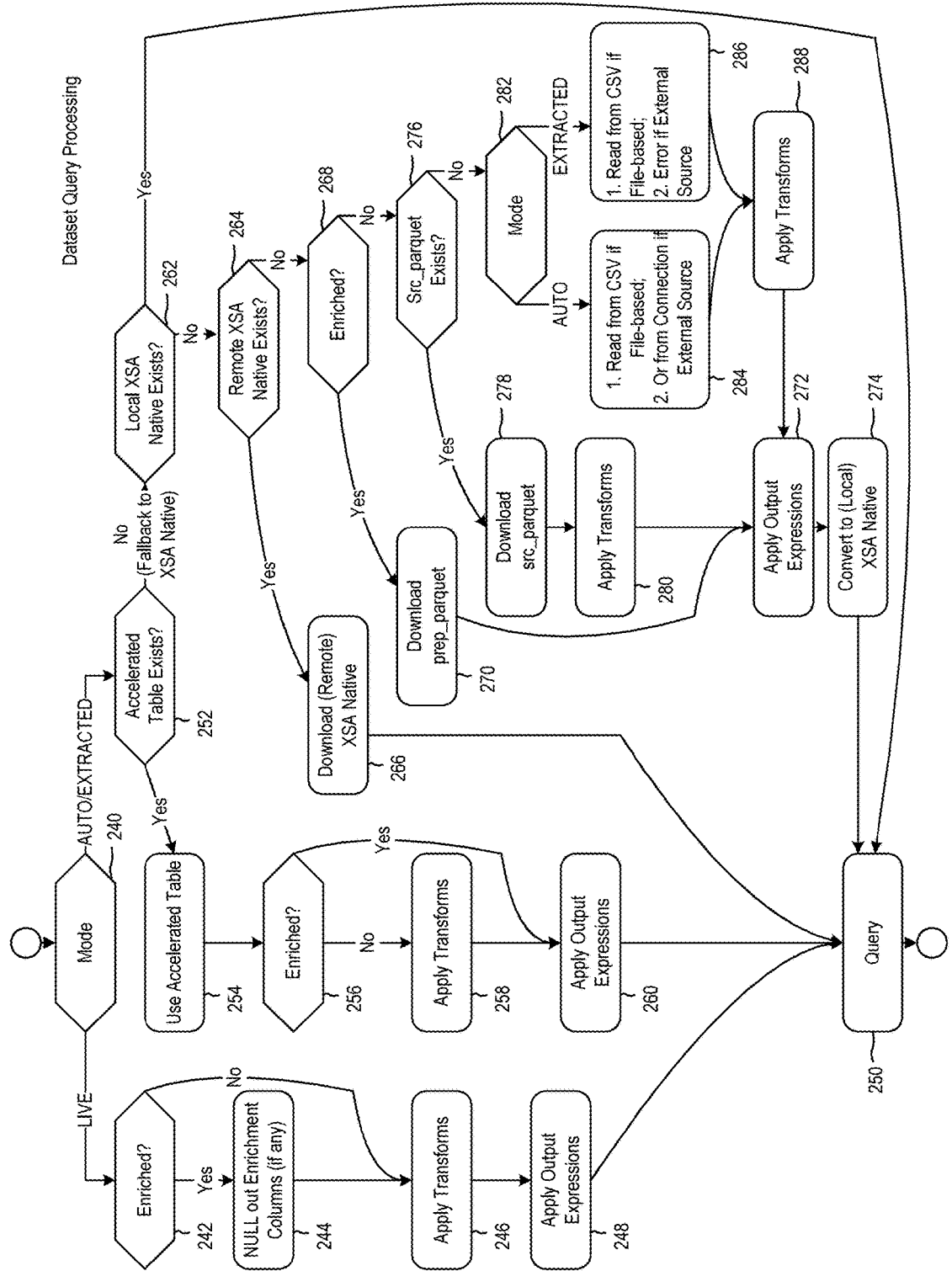
FIG. 23 illustrates query processing, including the use of query acceleration, in accordance with an embodiment.

As illustrated in FIG. 23, in accordance with an embodiment, in processing a dataset query, the system is adapted to first determine (240) live mode is selected for a dataset table (LIVE) or if automatic caching mode is selected (AUTO/EXTRACTED).

Figure 24:
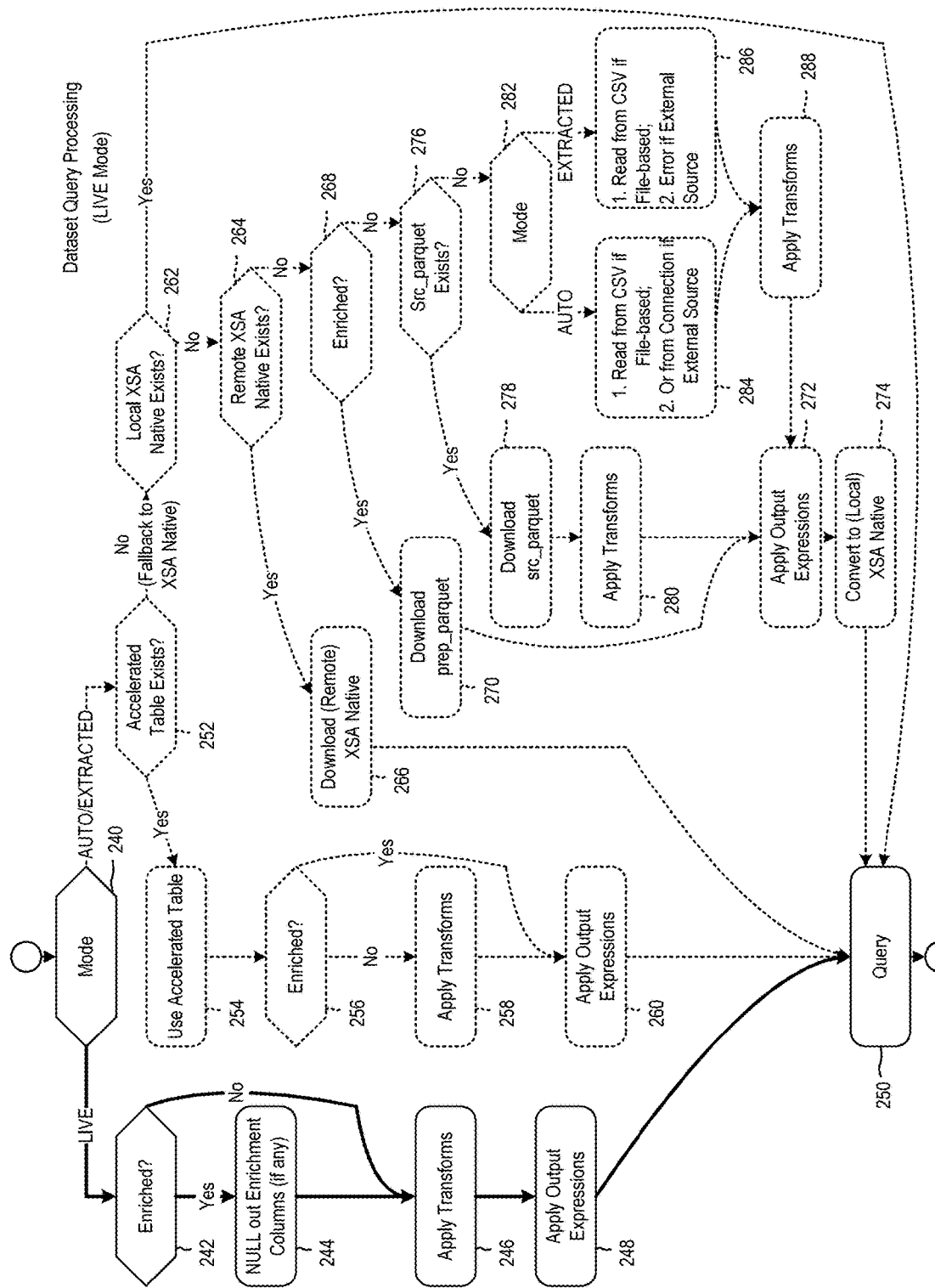
FIG. 24 further illustrates query processing for various types of datasets, including the use of query acceleration, in accordance with an embodiment.

As illustrated in FIG. 24, in accordance with an embodiment, if the mode is determined to be LIVE, then the system can determine (242) if the dataset is enriched, and if so NULL out any enrichment columns (244); apply transforms (246); apply output expressions (248); and process the query (250).

Figure 25:
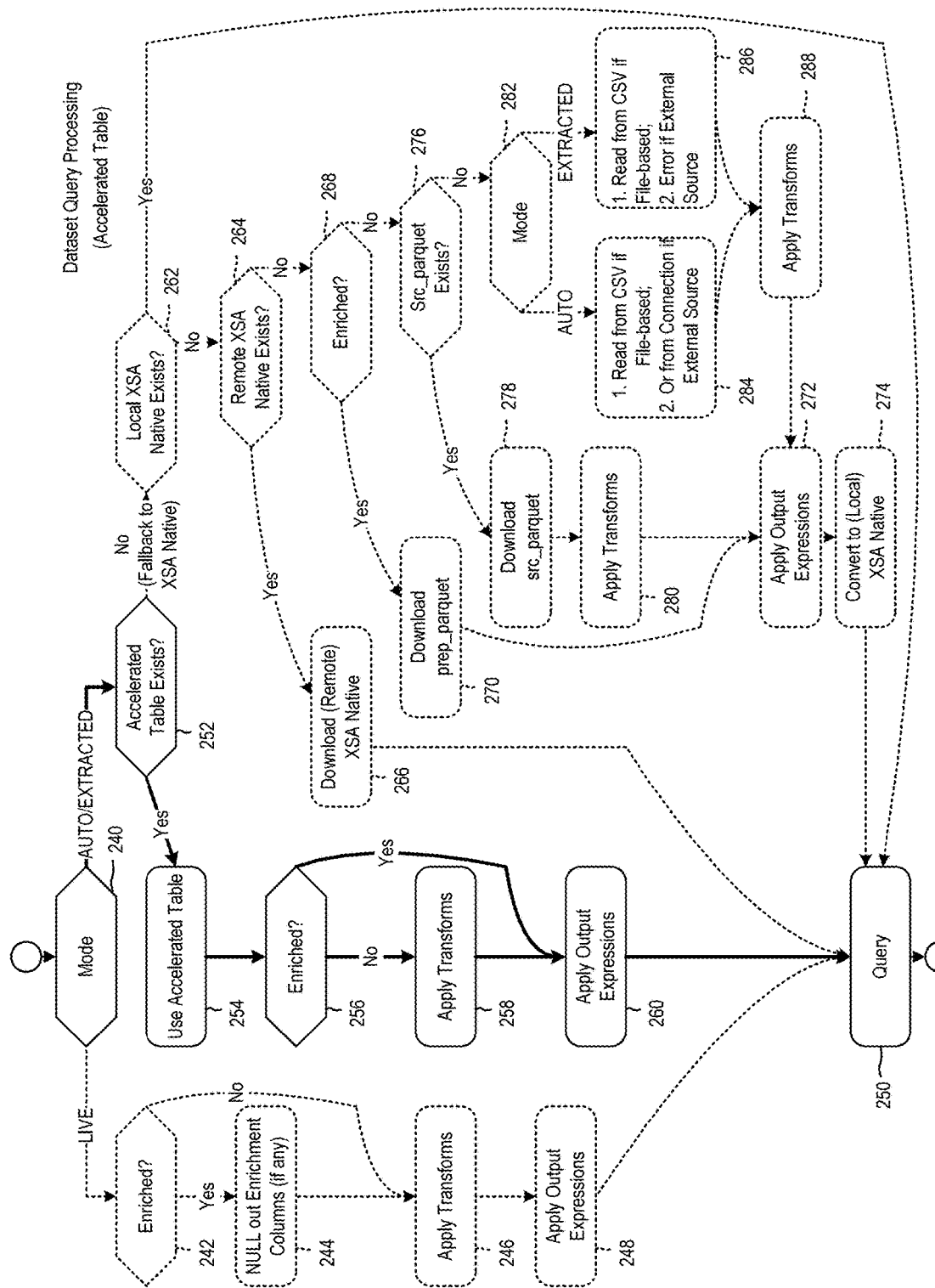
FIG. 25 further illustrates query processing for various types of datasets, including the use of query acceleration, in accordance with an embodiment.

As illustrated in FIG. 25, in accordance with an embodiment, if the mode is determined to be AUTO/EXTRACTED, then a determination (252) can be made as to whether an accelerated table exists. If so, then the accelerated table can be used (254); and depending on whether the dataset is enriched (256), the system can apply transforms (258) and/or output expressions (260); and process the query.

Figure 26:
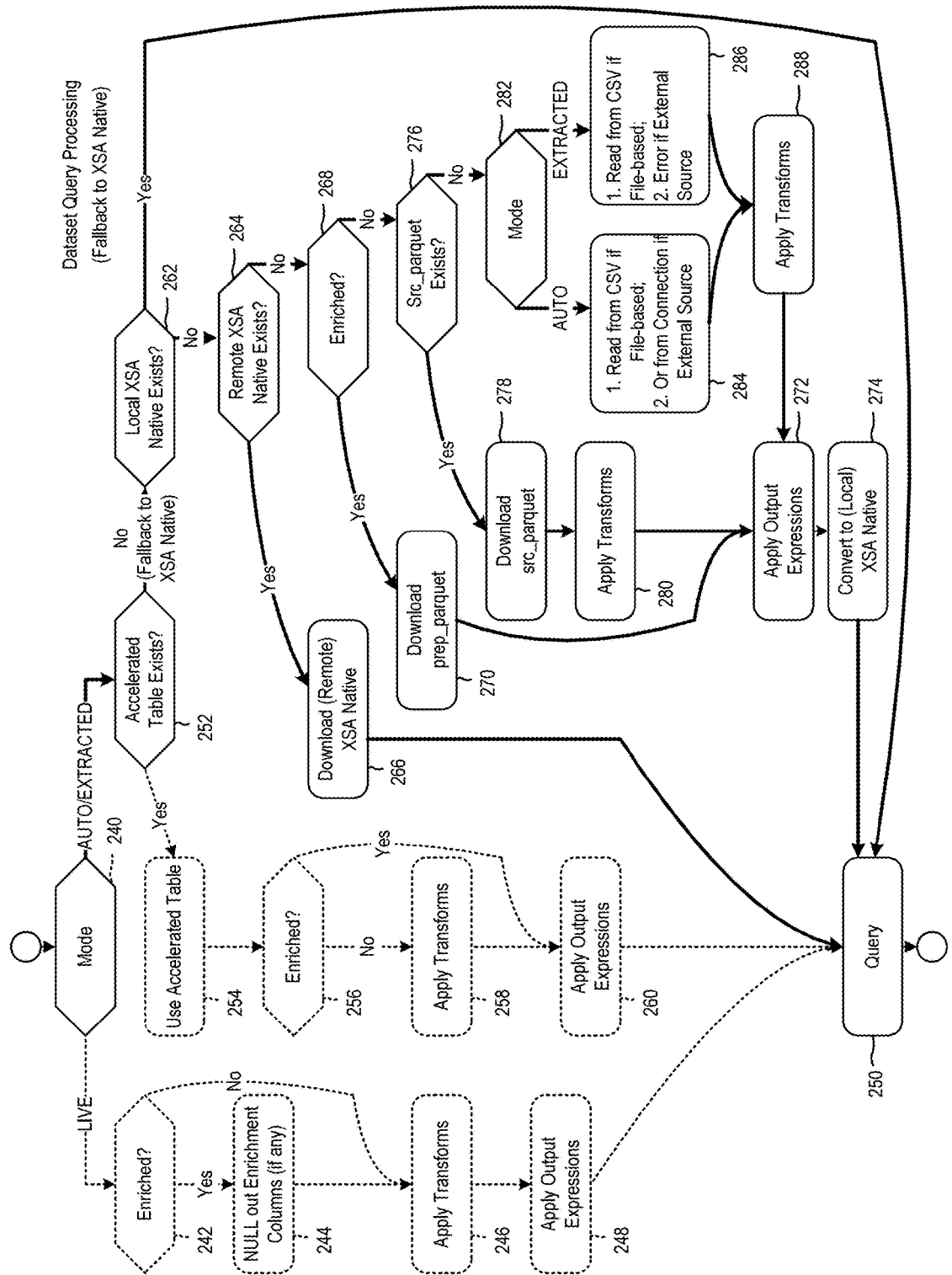
FIG. 26 further illustrates query processing for various types of datasets, including the use of query acceleration, in accordance with an embodiment.

As illustrated in FIG. 26, in accordance with an embodiment, if the system determines that an accelerated table does not exist, then it can fallback to using XSA Native. A determination (262) is made as to whether a local XSA Native exists, and if so, the query is processed In accordance with an embodiment, if the system determines that no local XSA Native exists, then a determination (264) can be made as to whether a remote (object storage) XSA Native exists, and if so the (remote) XSA Native is downloaded (266), and the query is processed.

In accordance with an embodiment, if the system determines that no remote (object storage) XSA Native exists, then a determination (268) can be made as to whether the dataset is enriched. If so, then a prepared format (e.g., prep_parquet) is downloaded (270), the system can apply output expressions (272), convert to (local) XSA Native (274), and process the query.

In accordance with an embodiment, if the system determines that the dataset is not enriched, then a determination (276) can be made as to whether a source format (e.g., src-parquet) exists. If so, then the src-parquet is downloaded (278), the system can apply transforms (280) and/or output expressions, convert to (local) XSA Native, and process the query.

In accordance with an embodiment, if the system determines that no source format (e.g., src-parquet) exists (282), then depending on the mode (e.g., AUTO/EXTRACTED), the system can respectively: read (284) from a CSV if file-based, or from a connection if external sources; or read (286) from CSV if file-base, or provide an error if external source; and then apply transforms (288) and/or output expressions, convert to (local) XSA Native, and process the query.

The examples shown and described in FIGS. 23-26 are provided for purposes of illustrating an example dataset lifecycle and query flow. In accordance with other embodiments and examples, the approach described herein can be used to support other types of dataset lifecycles and query flows.

Figure 27:
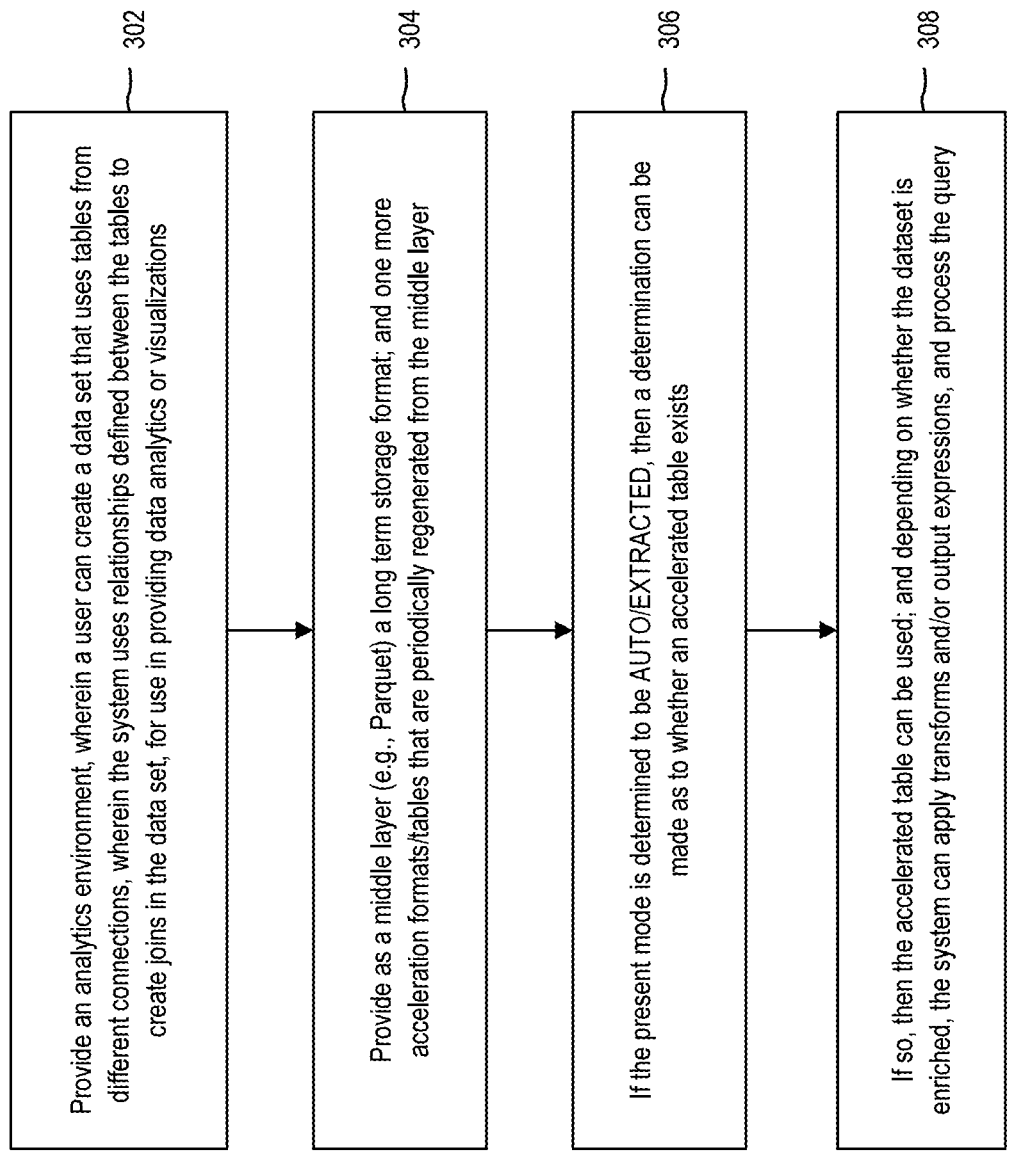
FIG. 27 illustrates a method for providing query acceleration with a data analytics environment, in accordance with an embodiment.

FIG. 27 illustrates a method for providing query acceleration with a data analytics environment, in accordance with an embodiment.

As illustrated in FIG. 27, in accordance with an embodiment, at step 302, an analytics environment is provided, wherein a user can create a data set that uses tables from different connections, wherein the system uses relationships defined between the tables to create joins in the data set, for use in providing data analytics or visualizations.

At step 304, a middle layer (e.g., Parquet) is provided as a long-term table data storage format; and one more acceleration formats, or acceleration tables, can be periodically regenerated from the middle layer.

At step 306, if the present mode is determined to be AUTO/EXTRACTED, then a determination can be made as to whether an accelerated table exists.

At step 308, if so, then the accelerated table can be used; and depending on whether the dataset is enriched, the system can apply transforms and/or output expressions, and process the query.

Figure 28:
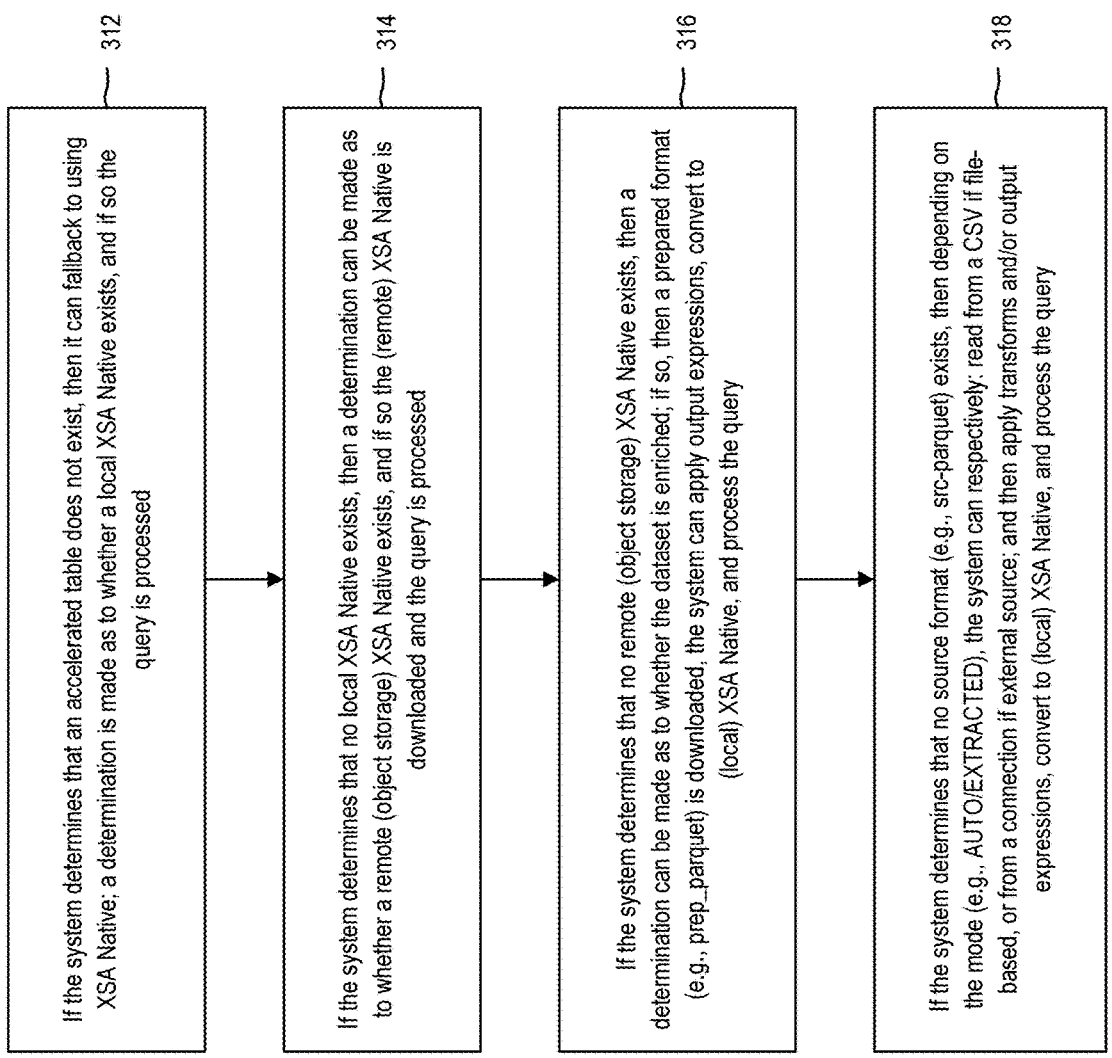
FIG. 28 further illustrates a method for providing query acceleration with a data analytics environment, in accordance with an embodiment.

FIG. 28 further illustrates a method for providing query acceleration with a data analytics environment, in accordance with an embodiment.

As illustrated in FIG. 28, in accordance with an embodiment, at step 312, if the system determines that an accelerated table does not exist, then it can fallback to using XSA Native; a determination is made as to whether a local XSA Native exists, and if so the query is processed.

At step 314, if the system determines that no local XSA Native exists, then a determination can be made as to whether a remote (object storage) XSA Native exists, and if so the (remote) XSA Native is downloaded, and the query is processed.

At step 316, If the system determines that no remote (object storage) XSA Native exists, then a determination can be made as to whether the dataset is enriched; if so, then a prepared format (e.g., prep_parquet) is downloaded, the system can apply output expressions, convert to (local) XSA Native, and process the query.

At step 318, if the system determines that no source format (e.g., src-parquet) exists, then depending on the mode (e.g., AUTO/EXTRACTED), the system can respectively: read from, e.g., a CSV if file-based, or from a connection if external source; and then apply transforms and/or output expressions, convert to (local) XSA Native, and process the query.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of an analytic applications environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing query acceleration with a computing environment that supports data analytics, comprising:
   a computer having a processor, memory, and data analytics environment operating thereon;
   a business intelligence server, comprising a plurality of query engine nodes, that describes data available as subject areas for queries, and receives and processes incoming queries directed to data stored at a database, in accordance with query execution plans; and
   wherein the system provides a query acceleration process for use in examining datasets including the use of a dataset lifecycle and one or more query flows, wherein a dataset operates as a data model that indicates one or more data source connections, data enrichments, or data transformations, and wherein said query acceleration process includes:
      generating a data structure comprising a plurality of accelerated tables for use with a plurality of datasets, and associating each dataset, of the plurality of datasets, with a metadata to indicate the dataset has been cached within the data structure as one or more accelerated tables of the plurality of accelerated tables; and
      coordinating use of the data structure comprising the plurality of accelerated tables by the plurality of query engine nodes including, in response to a query received via a query engine node, of the plurality of query engine nodes, directed to a particular dataset of the plurality of datasets, and associated with a query execution plan:
         determining whether the query can be processed using an accelerated table associated with the particular dataset, according to the data lifecycle that assesses whether one or more of the accelerated table, or a local native format table, or a remote native format table, exists; and,
         in response to a determination is made that an accelerated table associated with the particular dataset exists and can be used to process the query, modifying the query execution plan to obtain query results by reading, from the data structure, the accelerated table associated with the particular dataset;
   wherein use of the accelerated tables is distributed across query engine nodes sharing an endpoint, including that each query engine node sharing the endpoint uses locks to load datasets into memory, or unload datasets, depending on current outstanding requests.

2. The system of claim 1,
   wherein a middle layer is provided as a long-term table data storage format; and
   wherein the plurality of accelerated tables are periodically regenerated from the middle layer, wherein a determination is made as to whether an accelerated table exists for a dataset table, and in response to determining said accelerated table exists, the accelerated table is used to process the query.

3. The system of claim 2, wherein in response to a determination is made that the accelerated table does not exist for the dataset table, then a determination is made as to whether a local native format table exists, and in response to determining said local native format table exists, the query is processed using the local native format table.

4. The system of claim 3, wherein in response to a determination is made that no local native format table exists, then a determination is made as to whether a remote native format table exists, and in response to determining said remote native format table exists, the remote native format table is downloaded, and the query is processed.

5. The system of claim 4, wherein in response to a determination is made that no remote native format table exists, then:
   a determination is made as to whether the dataset is enriched;
   a prepared format is downloaded;
   the system applies output expressions, converts the dataset table to a native format table, and processes the query.

6. The system of claim 1, wherein the system is provided within a cloud environment.

7. The system of claim 1, wherein responsibility of coordinating use of the data structure comprising the plurality of accelerated tables by the plurality of query engine nodes is distributed across the plurality of query engine nodes sharing an endpoint, including that each query engine node, of the plurality of query engine nodes, runs a daemon thread that periodically attempts to load and unload datasets depending on current outstanding requests.

8. The system of claim 1, wherein each customer or tenant of the environment is associated with their own customer schema and is additionally provided with read-only access to an analytic applications schema, for use in receiving and processing incoming queries.

9. A method for providing query acceleration with a computing environment that supports data analytics, comprising:
providing, at a computer having a processor, memory, for use with a data analytics environment, a business intelligence server, comprising a plurality of query engine nodes, that describes data available as subject areas for queries, and receives and processes incoming queries directed to data stored at a database, in accordance with query execution plans; and
providing a query acceleration process for use in examining datasets including the use of a dataset lifecycle and one or more query flows, wherein a dataset operates as a data model that indicates one or more data source connections, data enrichments, or data transformations, and wherein said query acceleration process includes:
generating a data structure comprising a plurality of accelerated tables for use with a plurality of datasets and associating each dataset, of the plurality of datasets, with a metadata to indicate the dataset has been cached within the data structure as one or more accelerated tables of the plurality of accelerated tables; and
coordinating use of the data structure comprising the plurality of accelerated tables by the plurality of query engine nodes including, in response to a query received via a query engine node, of the plurality of query engine nodes, directed to a particular dataset of the plurality of datasets, and associated with a query execution plan:
determining whether the query can be processed using an accelerated table associated with the particular dataset, according to the data lifecycle that assesses whether one or more of the accelerated table, or a local native format table, or a remote native format table, exists; and,
in response to a determination is made that an accelerated table associated with the particular dataset exists and can be used to process the query, modifying the query execution plan to obtain query results by reading, from the data structure, the accelerated table associated with the particular dataset;
wherein use of the accelerated tables is distributed across query engine nodes sharing an endpoint, including that each query engine node sharing the endpoint uses locks to load datasets into memory, or unload datasets, depending on current outstanding requests.

10. The method of claim 9,
wherein a middle layer is provided as a long-term table data storage format; and
wherein the plurality of accelerated tables are periodically regenerated from the middle layer, wherein a determination is made as to whether an accelerated table exists for a dataset table, and in response to determining said accelerated table exists, the accelerated table is used to process the query.

11. The method of claim 10, wherein in response to a determination is made that the accelerated table does not exist, then a determination is made as to whether a local native format table exists, and in response to determining said local native format table exists, the query is processed using the local native format table.

12. The method of claim 11, wherein in response to a determination is made that no local native format table exists, then a determination is made as to whether a remote native format table exists, and in response to determining said remote native format table exists, the remote native format table is downloaded, and the query is processed.

13. The method of claim 12, wherein in response to the system determines that no remote native format table exists, then:
a determination is made as to whether the dataset is enriched;
a prepared format is downloaded;
the method applies output expressions, converts the dataset table to a native format table, and processes the query.

14. The method of claim 9, wherein the method is performed by a system provided within a cloud environment.

15. The method of claim 9, wherein responsibility of coordinating use of the data structure comprising the plurality of accelerated tables by the plurality of query engine nodes is distributed across the plurality of query engine nodes sharing an endpoint, including that each query engine node, of the plurality of query engine nodes, runs a daemon thread that periodically attempts to load and unload datasets depending on current outstanding requests.

16. The method of claim 9, wherein a dataflow is used to populate a dataset into accelerated tables, including wherein the system operates to access or receive a latest dataset, load its data into an acceleration format, and update a metadata associated therewith to indicate that the dataset has been stored as one or more accelerated tables.

17. A non-transitory computer readable storage medium having instructions thereon, which when read and executed by a computer including one or more processors cause the computer to perform a method comprising:
providing, for use with a data analytics environment, a business intelligence server, comprising a plurality of query engine nodes, that describes data available as subject areas for queries, and receives and processes incoming queries directed to data stored at a database, in accordance with query execution plans; and
providing a query acceleration process for use in examining datasets including the use of a dataset lifecycle and one or more query flows, wherein a dataset operates as a data model that indicates one or more data source connections, data enrichments, or data transformations, and wherein said query acceleration process includes:
generating a data structure comprising a plurality of accelerated tables for use with a plurality of datasets and associating each dataset, of the plurality of datasets, with a metadata to indicate the dataset has been cached within the data structure as one or more accelerated tables of the plurality of accelerated tables; and
coordinating use of the data structure comprising the plurality of accelerated tables by the plurality of query engine nodes including, in response to a query received via a query engine node, of the plurality of query engine nodes, directed to a particular dataset of the plurality of datasets, and associated with a query execution plan:
determining whether the query can be processed using an accelerated table associated with the particular dataset, according to the data lifecycle that assesses whether one or more of the accelerated table, or a local native format table, or a remote native format table, exists; and, in response to a determination is made that an accelerated table associated with the particular dataset exists and can be used to process the query, modifying the query execution plan to obtain query results by reading, from the data structure, the accelerated table associated with the particular dataset;

wherein use of the accelerated tables is distributed across query engine nodes sharing an endpoint, including that each query engine node sharing the endpoint uses locks to load datasets into memory, or unload datasets, depending on current outstanding requests.

18. The non-transitory computer readable medium of claim 17, wherein a middle layer is provided as a long-term table data storage format; and wherein the plurality of accelerated tables are periodically regenerated from the middle layer, wherein a determination is made as to whether an accelerated table exists for a dataset table, and in response to determining said accelerated table exists, the accelerated table is used to process the query.

19. The non-transitory computer readable medium of claim 18, wherein in response to a determination is made that the accelerated table does not exist, then a determination is made as to whether at least one of a local native format table or a remote native format table exists, and in response to determining at least one of said local native format table or said remote native format table exists, the query is processed using the local native format table or remote native format table.

20. The non-transitory computer readable medium of claim 17, wherein the method is performed by a system provided within a cloud environment.

* * * * *